United States Patent
Gao et al.

(10) Patent No.: US 7,942,063 B2
(45) Date of Patent: May 17, 2011

(54) PROCESSING APPARATUS

(75) Inventors: Wei Gao, Miyagi (JP); Yong Jin Noh, Miyagi (JP); Yoshikazu Arai, Miyagi (JP); Hirokazu Odagiri, Miyagi (JP)

(73) Assignees: Tohoku Techno Arch Co., Ltd., Miyagi (JP); Sony Corporation, Tokyo (JP)

( * ) Notice: Subject to any disclaimer, the term of this patent is extended or adjusted under 35 U.S.C. 154(b) by 223 days.

(21) Appl. No.: 12/334,130

(22) Filed: Dec. 12, 2008

(65) Prior Publication Data

US 2009/0151433 A1   Jun. 18, 2009

(30) Foreign Application Priority Data

Dec. 14, 2007   (JP) .................. 2007-324022

(51) Int. Cl.
*G01B 5/30* (2006.01)
(52) U.S. Cl. ........................................... 73/760
(58) Field of Classification Search ............. 73/760–860
See application file for complete search history.

(56) References Cited

U.S. PATENT DOCUMENTS

| | | | | |
|---|---|---|---|---|
| 3,702,948 A | * | 11/1972 | Balamuth | 310/323.18 |
| 4,230,369 A | * | 10/1980 | Gurries | 299/14 |
| 4,568,029 A | * | 2/1986 | Newton et al. | 241/19 |
| 4,678,905 A | * | 7/1987 | Phillips | 250/227.21 |
| 5,660,104 A | * | 8/1997 | Heinzen et al. | 99/595 |
| 6,004,335 A | * | 12/1999 | Vaitekunas et al. | 606/169 |
| 7,691,106 B2 | * | 4/2010 | Schenberger et al. | 606/82 |
| 2007/0144315 A1 | | 6/2007 | Gardiner et al. | |

FOREIGN PATENT DOCUMENTS

| | | |
|---|---|---|
| JP | 2006-159299 | 6/2006 |
| WO | 2007/088197 | 8/2007 |

OTHER PUBLICATIONS

International Search Report dated Apr. 1, 2009, for corresponding Patent Application EP 08020991.9.

* cited by examiner

*Primary Examiner* — Max Noori
(74) *Attorney, Agent, or Firm* — K&L Gates LLP

(57) ABSTRACT

A processing apparatus is provided. The processing apparatus includes a processing portion, an actuator, a casing, a preload mechanism, a force sensor, and a detection unit. The processing portion includes a cutting edge. The actuator is configured to cause the processing portion to vibrate microscopically. The casing is configured to accommodate the actuator. The preload mechanism is disposed inside the casing and configured to impart a preload to the actuator. The force sensor is disposed between the cutting edge and the preload mechanism. The detection unit detects a cutting force of the processing portion based on an output of the force sensor.

8 Claims, 18 Drawing Sheets

PROCESSING APPARATUS

CROSS REFERENCES TO RELATED APPLICATIONS

The present application claims priority to Japanese Patent Application JP 2007-324022 filed in the Japanese Patent Office on Dec. 14, 2007, the entire contents of which is being incorporated herein by reference.

BACKGROUND

The present application relates to a processing apparatus for forming a microscopic pattern on a surface of a work to be processed.

A technique of forming a microscopic pattern on a surface of a work is a backbone of an information industry in recent years owing to a functional surface that can be newly created thereby. For example, a Fresnel lens, a micro prism, and a micro lens array exhibit an optical function and are thus widely used in the information industry. For example, by forming a three-dimensional microscopic pattern on a surface of a work and distributing the three-dimensional microscopic pattern on a constituent of a display portion of an FPD (Flat Panel Display), it becomes possible to provide a display with a light source intensity distribution correction function, an antireflection function, a rainbow/moire prevention function, and the like. The three-dimensional microscopic pattern is also formed for increasing power generation of a solar cell expected as a clean energy.

In recent years, various FPDs are available, such as small or medium-sized FPDs to large-area FPDs, and the same holds true for solar cells. The three-dimensional microscopic pattern formed for the purpose of providing the optical function or increasing the power generation varies depending on a device size and purpose. Thus, there is needed a technique of forming microscopic patterns for various target specs.

In addition, the technique can also find application in suppressing a frictional force by forming a microscopic pattern on an engine piston sliding portion and reducing an area in contact, for improving a tribological function. It is also possible to, for improving an interfacial function, form a self-clean surface having water repellency improved by the microscopic pattern, or improve characteristics such as heat conductivity, boundary layer flow, bearing, antirust, and adhesion. Furthermore, the technique is now widely applied to implant, biosensor, and the like in a field of biotechnology.

As the technique of forming a microscopic pattern, a processing method by which a highly precise surface pattern can be formed across a large area in real time is desirable. As an electrical, optical technique of forming a three-dimensional microscopic pattern, there are known various methods such as an electron beam depiction method, a laser depiction method, and a holographic method. Those methods are effective in producing a structure having an extremely short spatial wavelength of a micrometer to submicrometer order, such as a non-reflective surface, a diffraction grating, and a micro lens array, but are unsuited for producing complicated three-dimensional patterns.

Meanwhile, owing to advancements of precise motion control and measurement/high-precision processing tools, current ultra-precise cutting/grinding processing techniques have enabled processing to be easily carried out with precision of a submicrometer order or less. A typical example of such processing is a single-point diamond cutting processing method that involves processing a soft metal or the like by use of a high-precision processing machine while using a single-crystal diamond tool having a single extremely-sharp cutting edge. In the method above, it is possible to three-dimensionally control a movement of the tool with respect to a workpiece with high precision and at high speed by using an FTS (Fast Tool Servo) technique or an FTC (Fast Tool Control) technique. Compared to the electrical, optical processing method, the diamond cutting processing method is suited for forming a three-dimensional microscopic pattern having a spatial wavelength ranging from several ten micrometers to several hundred micrometers.

In the normal cutting processing, three axes including two orthogonal axes and a rotation axis are controlled by a lathe to thus form a target pattern on the work. The FTC on the other hand is a technique of controlling one of the two orthogonal axes by a mechanism that has high resolution, rigidity, and responsiveness, such as a piezoelectric device. Unlike normal mechanical processing, the FTC technique having a characteristic of controlling a tool at high speed has an important object of accurately measuring a force that acts on the tool during processing, for producing a microscopic pattern with high precision.

In this regard, Japanese Patent Application Laid-open No. 2006-159299, for example, has proposed a processing apparatus having a structure in which an actuator, a tool holder, a displacement sensor, and a force sensor are formed integrally. The actuator is constituted of a piezoelectric device (PZT) for driving a tool. The tool holder is coupled to the actuator and holds the tool. The displacement sensor is disposed coaxially with the actuator and measures a displacement of the tool. The force sensor measures a force applied to the tool. The actuator causes the tool to vibrate microscopically so that a surface of a work is processed. A cutting force is detected as a value obtained by subtracting an output of the force sensor detected when no processing is carried out from an output of the force sensor detected during processing. The output of the force sensor detected when no processing is carried out refers to an output of the force sensor detected when the tool is caused to vibrate microscopically without being brought into contact with the work. Accordingly, in-process monitoring of the cutting force of the tool becomes possible.

SUMMARY

In the processing apparatus disclosed in Japanese Patent Application Laid-open No. 2006-159299, the force sensor is disposed between a PZT case that accommodates the actuator in a preloaded state and a base that supports the PZT case. Therefore, the force sensor detects not only an inertial mass or vibration mass of the tool, but also the inertial mass or vibration mass of a system that includes the actuator and the PZT case. As a result, it becomes difficult to detect the cutting force of the tool with high precision, thus leading to a difficulty in processing control in a case where the work is made of a soft metal such as aluminum or copper.

In view of the circumstances above, there is a need for a processing apparatus capable of detecting a cutting force with high precision.

According to an embodiment, there is provided a processing apparatus including a processing portion, an actuator, a casing, a preload mechanism, a force sensor, and a detection means. The processing portion includes a cutting edge. The actuator is configured to cause the processing portion to vibrate microscopically. The casing is configured to accommodate the actuator. The preload mechanism is disposed inside the casing and configured to impart a preload to the actuator. The force sensor is disposed between the cutting edge and the preload mechanism. The detection means detects a cutting force of the processing portion based on an output of the force sensor.

In the processing apparatus according to an embodiment, the force sensor is disposed between the cutting edge and the preload mechanism. As a result, the force sensor detects only a force component that is based on an inertial mass of the processing portion among the processing portion, the actuator, and the casing. Accordingly, because the output of the force sensor detected when no processing is carried out can be reduced, a difference between the output of the force sensor detected when no processing is carried out and the output thereof detected during processing increases, whereby it becomes possible to significantly improve detection precision of the cutting force.

In the processing apparatus according to an embodiment, the preload mechanism includes a head member that is in contact with the actuator and is driven relative to the casing, and an elastic member disposed between the casing and the head member and configured to press the head member against the actuator, and the force sensor is disposed between the cutting edge and the head member. Because the force sensor does not detect a reaction force of the elastic member, the force sensor can detect the cutting force during processing with high precision.

The processing portion includes a retention portion configured to retain the cutting edge. In this case, the force sensor may be disposed between the retention portion and the head member. Alternatively, the force sensor may be disposed between the cutting edge and the retention portion. Furthermore, the force sensor may alternatively be embedded in the retention portion. With this structure, the force sensor can detect the cutting force based only on an inertial mass of the cutting edge or an inertial mass of the cutting edge and retention portion. Thus, it becomes possible to additionally improve the detection precision of the cutting force.

Further, according to another embodiment n, there is provided a processing apparatus including a processing portion, an actuator, a casing, a preload mechanism, a force sensor, a displacement sensor, and a control means. The processing portion includes a cutting edge. The actuator is configured to cause the processing portion to vibrate microscopically. The casing is configured to accommodate the actuator. The preload mechanism is disposed inside the casing and configured to impart a preload to the actuator. The force sensor is disposed between the cutting edge and the preload mechanism. The displacement sensor is configured to detect a displacement of the processing portion. The control means drives the actuator based on an output of the force sensor and an output of the displacement sensor.

Because the output of the force sensor that is detected when no processing is carried out can be made small with this structure, the detection precision of the cutting force can significantly be improved by increasing the difference between the output of the force sensor detected when no processing is carried out and the output thereof detected during the processing. Moreover, feedback control can be carried out on the drive of the actuator based on the output of the displacement sensor, whereby it becomes possible to carry out processing control with high precision.

As described above, according to an embodiment, because the cutting force can be detected with high precision, a microscopic and complex three-dimensional pattern can be formed on the surface of the work with high precision.

Additional features and advantages are described herein, and will be apparent from the following Detailed Description and the figures.

DETAILED DESCRIPTION

An embodiment of the present application will be described with reference to the drawings.

First Embodiment

Structure of Processing Apparatus

Figure 1:
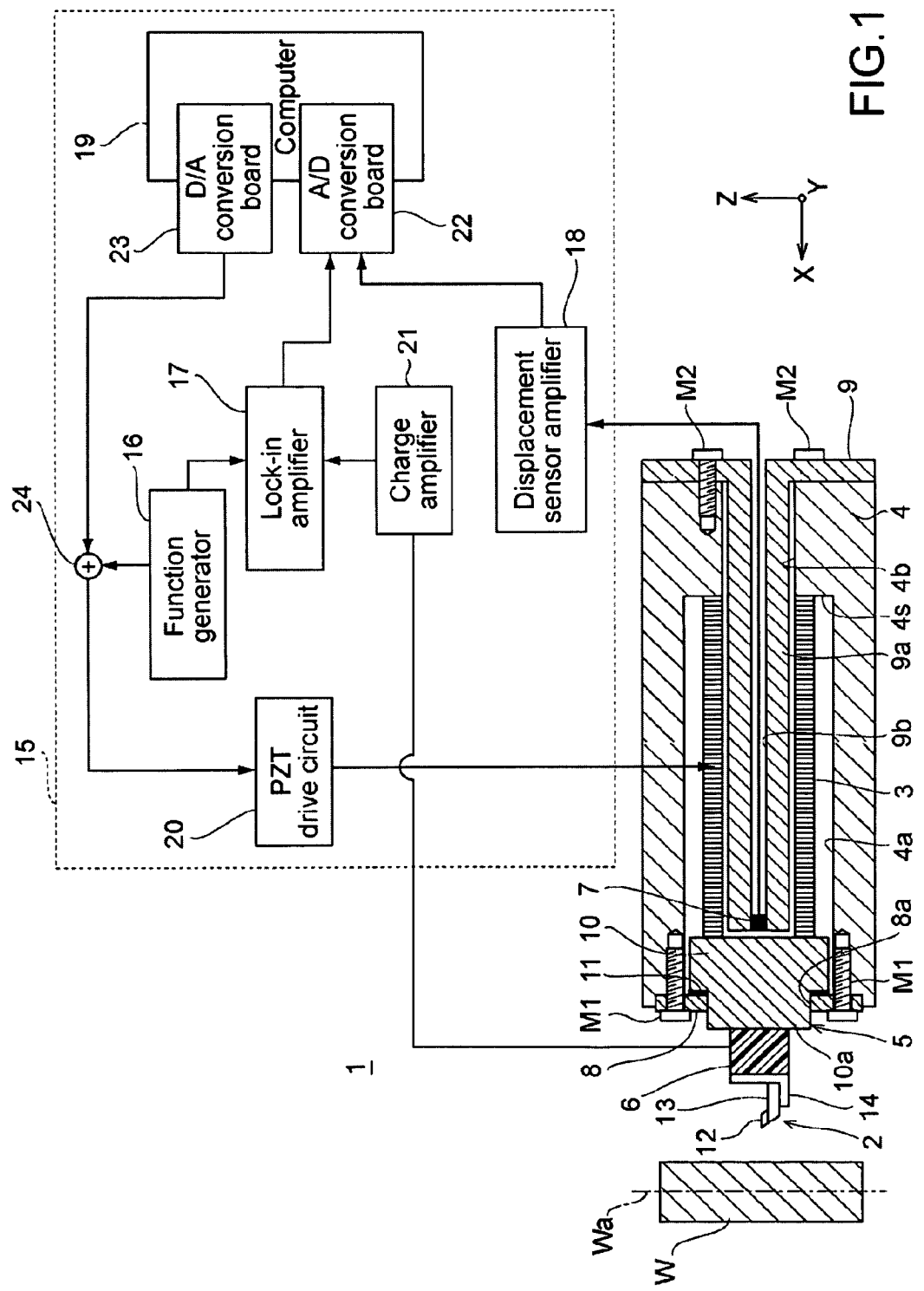
FIG. 1 is a schematic structural diagram of a processing apparatus according to a first embodiment.

FIG. 1 is a schematic cross-sectional diagram showing a structure of a processing apparatus according to a first embodiment.

A processing apparatus 1 of this embodiment includes a tool 2, an actuator 3 that causes the tool 2 to vibrate microscopically, a casing body 4 that supports the actuator 3, a preload mechanism 5 that is disposed inside the casing body 4 and imparts a preload to the actuator 3, a force sensor 6 disposed between the tool 2 and the preload mechanism 5, a displacement sensor 7 that detects a displacement of the tool 2 with respect to the casing body 4, and a controller 15 that drives the actuator 3.

The casing body 4 has a cylindrical shape and is internally formed with a stepped hole constituted of a large-diameter hole portion 4a and a small-diameter hole portion 4b. The large-diameter hole portion 4a of the casing body 4 accommodates the actuator 3 and the preload mechanism 5. A first lid member 8 in which a circular through-hole 8a is formed at a center portion is attached to an opening of the large-diameter hole portion 4a by a plurality of screw members M1, while a columnar portion 9a of a second lid member 9 attached to an opening of the small-diameter hole portion 4b by a plurality of screw members M2 is inserted to the small-diameter hole portion 4b of the casing body 4. The first lid member 8 and the second lid member 9 constitute a "casing" of the present application together with the casing body 4.

The actuator 3 is constituted of a piezoelectric device high in rigidity and excellent in responsiveness. Particularly in this embodiment, the actuator 3 is constituted of a cylindrical PZT (lead zirconate titanate) laminated body and disposed concentrically with an annular space formed between the casing body 4 and the columnar portion 9a of the second lid member 9. Outer and inner circumferential surfaces of the actuator 3 are respectively opposed to an inner wall surface of the casing body 4 and an outer circumferential surface of the columnar portion 9a with gaps of a certain length or more respectively provided therebetween.

The actuator 3 is supported in a preloaded state between a stepped portion 4s of the stepped hole of the casing body 4 and a head member 10 constituting the preload mechanism 5. The preload mechanism 5 includes the head member 10 and an elastic member 11. The head member 10 is formed with, on a front surface side thereof, a convex portion 10a that fits with the through-hole 8a of the first lid member 8 with a predetermined clearance. The head member 10 is in contact with a tip end of the actuator 3 on a back surface side thereof.

The elastic member 11 is constituted of a wave washer and positioned between the first lid member 8 and an outer circumference of the convex portion 10a of the head member 10 in a compressed state. With this structure, the head member 10 is pressed against the actuator 3 by a resilience of the elastic member 11, thus imparting a preload to the actuator 3 in a compression direction. The preload imparted to the actuator 3 is adjusted by a tightening amount of the screw members M1. By constituting the elastic member 11 by the wave washer, the elastic member 11 can be made thinner, and a large elastic force can be generated with a small deformation amount. It should be noted that instead of the wave washer, other spring members such as a plate spring or other rubber members may be used.

The tool 2 is constituted of a cutting edge 12 and a shank 13 that retains the cutting edge 12. The cutting edge 12 is formed of a single-crystal diamond with a sharp blade edge, but the shape and material of the cutting edge are not limited thereto. The cutting edge 12 and the shank 13 are fixed in position by, for example, brazing. The tool 2 is retained by a tool holder 14. It should be noted that the shank 13 and the tool holder 14 correspond to a "retention portion" of an embodiment.

It should be noted that the tool is prepared in various shapes and is detachable in accordance with a processing pattern to be obtained. Specifically, as will be described later, when processing a surface of a work W to obtain a mirror-like surface, a tool 29 for mirror-like processing (see FIG. 4A) whose tip end is formed with a certain curvature is used, whereas when forming a three-dimensional microscopic pattern on the surface of the work W, the tool 2 having the cutting edge 12 with a sharp tip end as described above (hereinafter, also referred to as "micro tool") is used.

The tool 2 is retained by the tool holder 14 using a fixation method such as a screw. The tool holder 14 has an L shape, though not limited thereto. Further, the shank 13 and the tool holder 14 can be integrated. Alternatively, a structure with only the cutting edge 12 and not the shank 13 and the tool holder 14 may be employed. The cutting edge 12, the shank 13, and the tool holder 14 constitute a "processing portion" of an embodiment.

The force sensor 6 is disposed between the cutting edge 12 and the preload mechanism 5. In this embodiment, the force sensor 6 is disposed between the tool holder 14 and the head member 10. Because a reaction force generated in the elastic member 11 during driving of the actuator 3 is not detected by the force sensor 6 when the force sensor 6 is disposed between the cutting edge 12 and the preload mechanism 5, a force detection sensitivity of the force sensor 6 can be improved.

The force sensor 6 is disposed on a surface of the convex portion 10a of the head member 10 so that a center portion thereof is positioned on a line extending from an axle center portion of the actuator 3. It should be noted that the force sensor 6 may be embedded in the surface of the head member 10 instead of being disposed thereon, for example.

The force sensor 6 is constituted of a piezoelectric device high in rigidity and excellent in responsiveness. Particularly in this embodiment, the force sensor 6 is constituted of a piezoelectric device (PZT) laminated body. An output of the force sensor 6 is supplied to the controller 15. It should be noted that for enhancing detection precision of the force sensor 6, it is desirable that the piezoelectric device constituting the force sensor 6 be disposed in a preloaded state.

The force sensor 6 is formed to have a smaller outside dimension than the elastic member 11 constituted of the wave washer. With this structure, an influence of moment about the cutting edge 12 during processing is suppressed, whereby force detection precision of the force sensor 6 can be improved.

Here, because a force detection sensitivity is normally unclear when using a commercially-supplied piezoelectric device as the force sensor 6, sensitivity calibration becomes necessary. An example of a calibration method is as follows.

Figure 2:
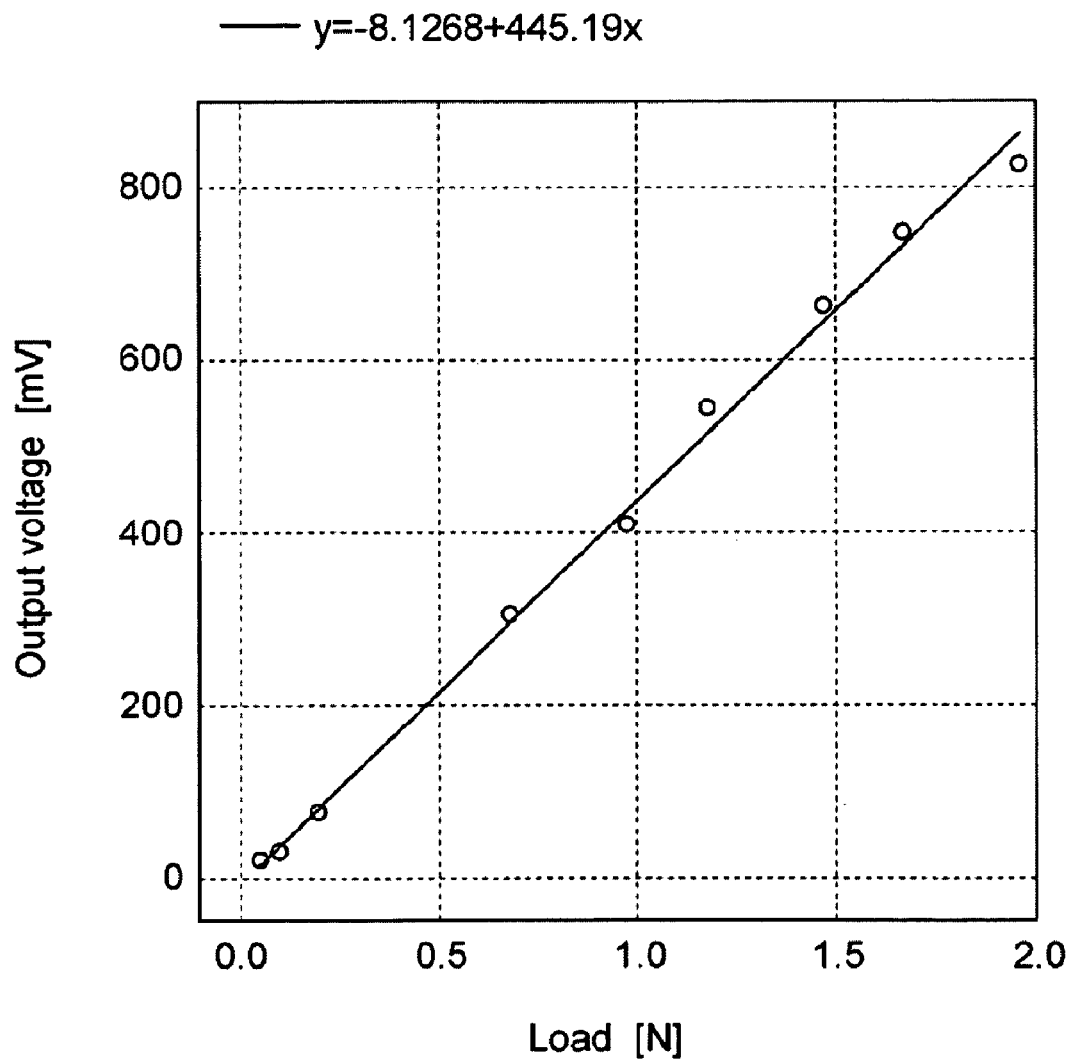
FIG. 2 is a graph showing an experimental result of an exemplary measurement of a force sensor sensitivity.

Specifically, a weight is hung from the preloaded piezoelectric device so as to release the preload, thus reducing the preload. After the output of the piezoelectric device is stabilized, the weight is raised at once to re-impart a reduced preload to the piezoelectric device. Then, a charge (voltage) generated in the piezoelectric device is amplified by a predetermined gain and measured. The task is carried out a plurality of times while changing a weight mass to thus obtain a relationship between the weight mass and the output voltage of the piezoelectric device as shown in FIG. 2. The sensitivity of the piezoelectric device corresponds to a tilt of an approximate line shown in FIG. 2. In the example of FIG. 2, the sensitivity of the piezoelectric device is about 445 mV/N.

Meanwhile, the displacement sensor 7 is disposed at a tip end of the columnar portion 9a of the second lid member 9. The columnar portion 9a is structured as a sensor holder and has a through-hole 9b at an axle center portion thereof. The displacement sensor 7 is attached to an end portion of the through-hole 9b so as to oppose a center portion of the back surface of the head member 10. In this embodiment, the displacement sensor 7 is constituted of a capacitance type displacement gauge. An output of the displacement sensor 7 is supplied to the controller 15.

Next, the controller 15 will be described in detail.

The controller 15 includes a function generator 16, a lock-in amplifier 17, a displacement sensor amplifier 18, a computer 19, and a PZT drive circuit 20.

The function generator 16 generates a sinusoidal wave signal for causing the actuator 3 to vibrate at a microscopic amplitude, and inputs the generated sinusoidal wave signal to the lock-in amplifier 17 and the PZT drive circuit 20. Based on the sinusoidal wave signal input from the function generator 16, the PZT drive circuit 20 generates a drive signal for causing the actuator 3 to vibrate at a microscopic amplitude and inputs the drive signal to the actuator 3. It should be noted that a direction in which the actuator 3 vibrates microscopically is an axial direction of the actuator 3 (X-axis direction in FIG. 1).

The lock-in amplifier 17 is connected to the function generator 16 and a charge amplifier 21. The lock-in amplifier 17 detects an AC output of the force sensor 6 via the charge amplifier 21 and amplifies an output signal having the same frequency as the sinusoidal wave signal input from the function generator 16. The amplified output signal of the force sensor 6 is input to the computer 19 via an A/D conversion board 22.

The A/D conversion board 22 is attached to the computer 19 and connected to the lock-in amplifier 17 and the displacement sensor amplifier 18. The A/D conversion board 22 converts the output signal of the force sensor 6 amplified by the lock-in amplifier 17 and the output signal of the displacement sensor 7 amplified by the displacement sensor amplifier 18 from analog signals to digital signals and transmits the converted signals to the computer 19.

The computer 19 has a predetermined built-in computing unit and memory and is capable of carrying out various analyses based on the output signal of the force sensor 6 and the output signal of the displacement sensor 7, the various analyses specifically including a detection of an in-contact state of the cutting edge 12 with the surface of the work W, a cutting force detection, a surface processing pattern detection, and the like. Although not shown, a display for displaying an analysis result is connected to the computer 19. It should be noted that the computer 19 is a specific example of a "detection means" of an embodiment.

The computer 19 stores a processing profile of the three-dimensional microscopic pattern to be formed on the surface of the work W. The computer 19 makes the PZT drive circuit 20 cause the actuator 3 to extend and retract in the axial direction (X-axis direction in FIG. 1) to thus control the tool 2 to come close to or be set apart from the surface of the work W. A control signal used for the control is input to the PZT drive circuit 20 from the computer 19 via a D/A conversion board 23 and an adder 24. By carrying out the extension/retraction control of the actuator 3 based on the processing profile, a predetermined three-dimensional microscopic pattern is formed on the surface of the work W. It should be noted that an extension/retraction amount of the actuator 3 is within the range of an elastic deformation amount of the elastic member 11.

The D/A conversion board 23 is attached to the computer 19 and connected to the adder 24. The D/A conversion board 23 converts the digital signal transmitted from the computer 19 into an analog signal and inputs the signal to the adder 24. The adder 24 adds the output signal from the D/A conversion board 23 and the output signal from the function generator 16 and inputs the added signal to the PZT drive circuit 20.

Meanwhile, the piezoelectric device (PZT) used as the actuator 3 shows non-linear voltage-displacement characteristics, a cause of which is hysteresis. Hysteresis is a phenomenon in which a response of the displacement with respect to a voltage is non-linear and the response at a time of a voltage raise does not match the response at a time of a voltage decrease. Another cause of the non-linear voltage-displacement characteristics is creep. Creep is a phenomenon in which the displacement gradually changes with time even when a certain voltage is applied to retain a certain position. Therefore, it is necessary to detect a position of the tool and carry out feedback control.

Figure 3:
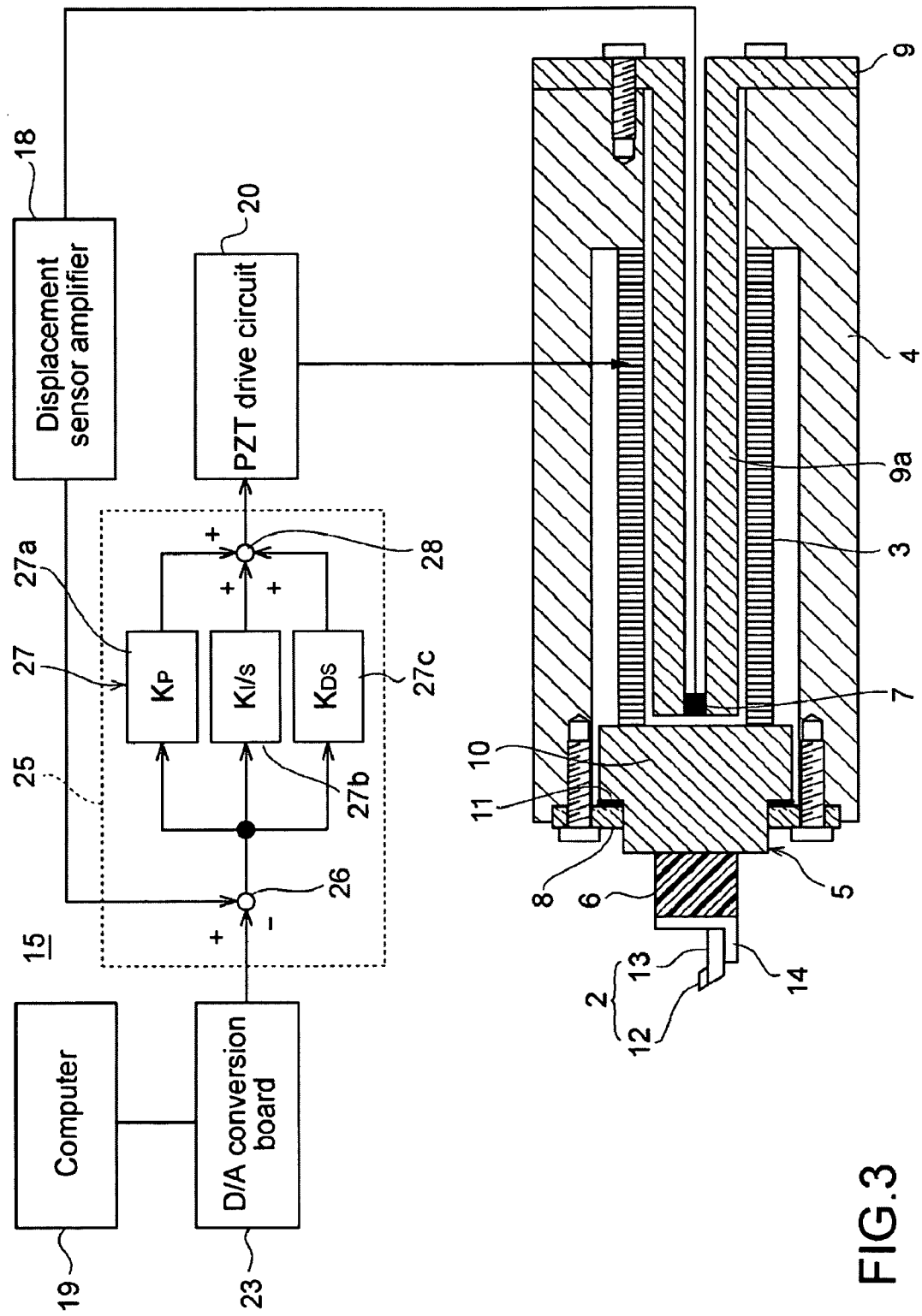
FIG. 3 is a diagram showing a modification of a structure of the processing apparatus shown in FIG. 1.

In this case, by disposing a PID controller 25 between the PZT drive circuit 20 and the D/A conversion board 23 as shown in FIG. 3, it becomes possible to carry out feedback control of the driving of the actuator 3 based on the displacement of the tool 2 measured by the displacement sensor 7. It should be noted that in FIG. 3, illustrations of the function generator 16, the lock-in amplifier 17, the charge amplifier 21, and the A/D conversion board 22 are omitted.

The PID controller 25 includes a comparator 26 that carries out a comparison operation between the output signal from the D/A conversion board 23 and the output signal from the displacement sensor amplifier 18, a PID control section 27 constituted of a proportional control block 27a, an integral control block 27b, and a derivative control block 27c, and an adder 28 that adds output signals of the control blocks 27a to 27c.

In the controller 15 shown in FIG. 3, the PID controller 25 carries out the comparison operation between an instruction value from the computer 19 and the output signal of the displacement sensor 7 and transmits a control signal to the PZT drive circuit 20 to thus enable feedback control to be carried out on the driving of the actuator 3. It should be noted that the PID controller 25 is a structural example of a "control means" of an embodiment.

The processing apparatus 1 of this embodiment structured as described above is placed on an XYZ stage (not shown) and structured to be movable in an X-axis direction, a Y-axis direction, and a Z-axis direction (height direction) shown in FIG. 1 with respect to the work W. The processing apparatus 1 is moved to an arbitrary processing position on the surface of the work W by the XYZ stage. The work W is rotationally driven about an axle center Wa. It should be noted that an XY stage may be used instead of the XYZ stage. In this case, the work W is moved relative to the processing apparatus 1 in the Z-axis direction.

Next, an operation of the thus-structured processing apparatus 1 of this embodiment will be described.

On the XYZ stage (not shown), the processing apparatus 1 is rested at a certain distance or more in the X-axis direction from the processing position on the surface of the work W. Subsequently, the processing apparatus 1 processes the work W by the following procedure.

Figure 4:
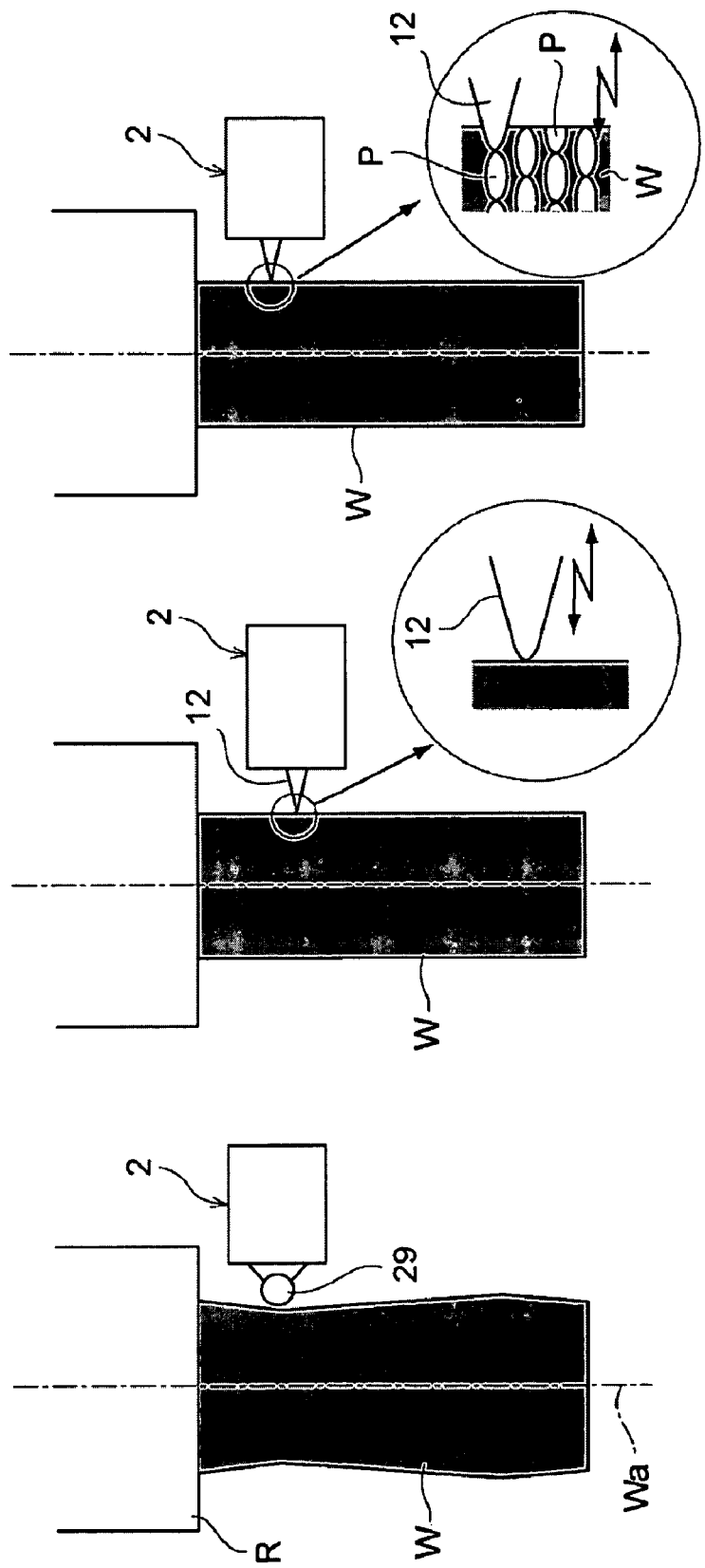
FIG. 4 are diagrams for illustrating a procedure for processing a work by using the processing apparatus shown in FIG. 1.

FIGS. 4A to 4C are schematic diagrams showing a procedure for processing the work W by the processing apparatus 1. The work W is attached to a lathe spindle R. The axle center Wa of the work W coincides with an axle center of the spindle R.

(Mirror-Like Processing)

As shown in FIG. 4A, a mirror-like processing tool 29 having a curvature radius of 2.0 mm is first attached to the processing apparatus 1. Then, the work W is rotated a predetermined number of rotations with the axle center Wa thereof as a center, and the surface of the work W is processed to be mirror-like using the mirror-like processing tool 29.

The mirror-like processing process is carried out for smoothing the surface of the work W in a case where the surface is rough and is thus not fit to be processed for forming the three-dimensional microscopic pattern thereon as it is. It should be noted that in the mirror-like processing process, it is desirable to use a tool that is hardly abraded and has a relatively large radius at a tip end thereof so that surface roughness of the surface of the work after the mirror-like processing is lessened.

Next, as shown in FIGS. 4B and 4C, in place of the tool 29, the micro tool 2 that has the cutting edge 12 with a sharp tip end is attached to the processing apparatus 1, and the surface of the work W is processed to form a three-dimensional microscopic pattern thereon.

FIG. 4B shows a process of detecting an in-contact state of the tool 2 with the work W. The in-contact state of the tool 2 and the work W is detected by the force sensor 6, the method of which will be described below. It should be noted that in the in-contact state detection process, the rotation of the work W is stopped.

(In-Contact State Detection)

First, referring to FIG. 1, a sinusoidal wave signal (voltage signal) of an arbitrary frequency generated by the function generator 16 is input to the actuator 3 via the PZT drive circuit 20. Consequently, the actuator 3 vibrates at the input frequency in the X-axis direction. Because the head member 10 to which the tool 2 is fixed is integrally in contact with the actuator 3, the extension/retraction of the actuator 3 imparts a vibration displacement of a microscopic amplitude to the tool 2 via the head member 10.

Next, the imparted vibration component of the tool 2 is detected by the force sensor 6 disposed between the tool 2 and the head member 10. The detection signal is transmitted to the charge amplifier 21 which then outputs a signal containing the signal of that frequency and a noise component to the lock-in amplifier 17. Meanwhile, the sinusoidal wave signal generated by the function generator 16 is input to the lock-in amplifier 17. In the lock-in amplifier 17, the sinusoidal wave signal output from the function generator 16 is used as a reference signal used for removing a noise signal from the output signal of the force sensor 6.

The output of the lock-in amplifier 17 is input to the computer 19 via the A/D conversion board 22. A magnitude of the output of the lock-in amplifier 17 is proportional to the amplitude of the force sensor 6. The computer 19 stores and processes this detection signal of the force sensor 6 as a signal Sw obtained before the tool 2 is brought into contact with the work W (hereinafter, also referred to as "idle signal").

Figure 5:
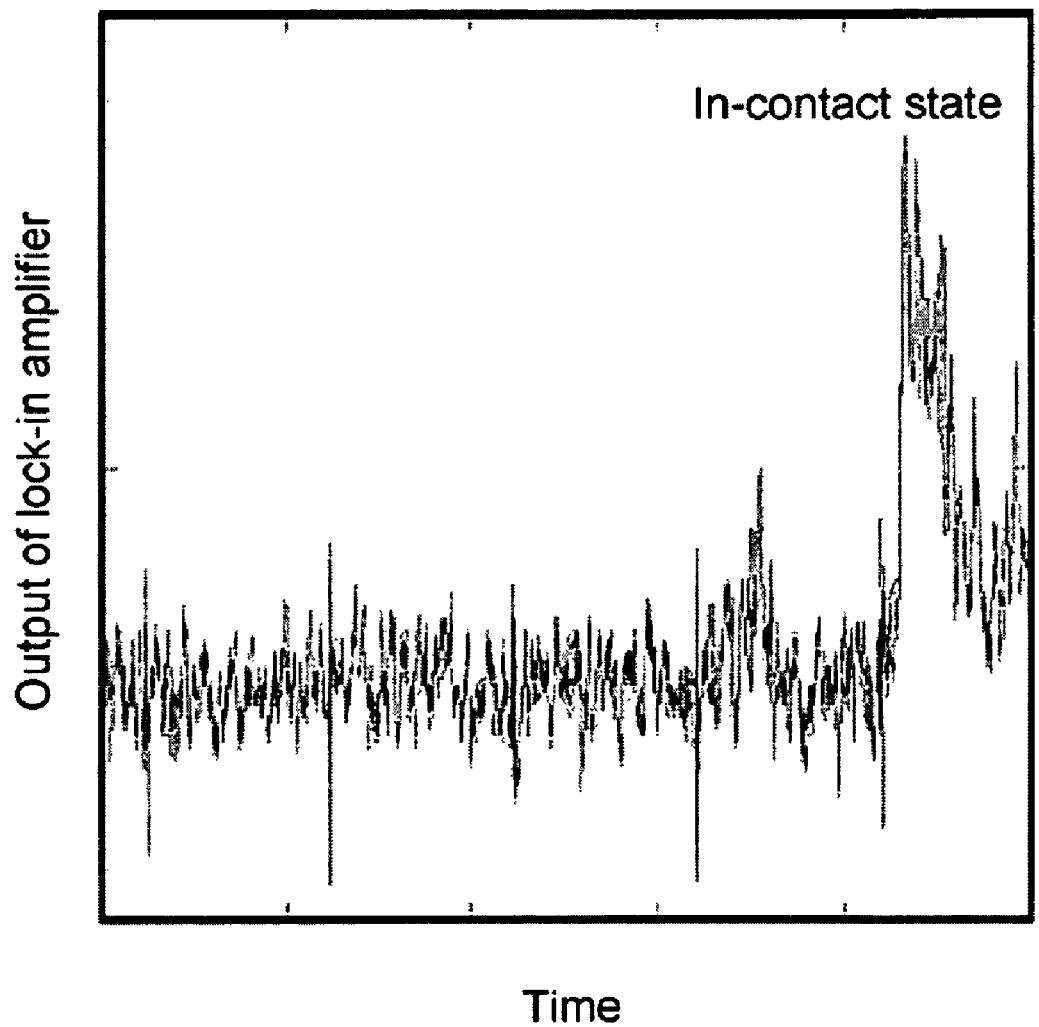
FIG. 5 is a diagram showing an exemplary output of the force sensor that has been measured in a process of detecting an in-contact state of the work and a tool.

Subsequently, the processing apparatus 1 is moved in the X-axis direction by the XYZ stage so that the tool 2 is brought close to the work W. When the tool 2 is brought into contact with the work W, an output of the force sensor 6 obtained at that time is output from the lock-in amplifier 17 to the computer 19. The measured amplitude of the force sensor 6 is increased from before the tool 2 is brought into contact with the work W, and thus the output of the lock-in amplifier 17 increases. FIG. 5 shows an exemplary output signal of the lock-in amplifier 17 obtained when the tool 2 is brought into contact with the work W. It can be seen from FIG. 5 that the output of the lock-in amplifier 17 is increased when the tool 2 is brought into contact with the work W.

Based on the output of the lock-in amplifier 17, the computer 19 detects the in-contact state of the tool 2 and the work W. The contact position of the tool 2 with the work W is stored in the computer 19. Accordingly, an initial position of the tool 2 and the work W is set. According to this embodiment, because a drive frequency component alone is highly-sensitively detected by the force sensor 6 and the lock-in amplifier 17, the contact position is measured with a high sensitivity.

(Microscopic Pattern Processing)

Next, as shown in FIG. 4C, the surface of the work W is processed so that a three-dimensional microscopic pattern is formed thereon.

First, after the tool 2 is pulled apart from the contact position with the work W by a predetermined distance, the spindle R is driven and the work W is rotated. Although not shown, the spindle R is provided with a rotary encoder. A pulse signal of the rotary encoder is input to the computer 19 constituting the controller 15 of the processing apparatus 1.

Next, while the tool 2 is caused to vibrate microscopically by the driving of the actuator 3, the tool 2 is moved to the contact position detected in the in-contact state detection process described above. With the pulse signal input from the rotary encoder as a clock, the computer 19 causes the actuator 3 to extend and retract based on the stored processing profile. Accordingly, as shown in FIG. 4C, the cutting processing is carried out with respect to the surface of the work W. Moreover, by moving the tool 2 relative to the work W in an axial direction of the work W, a predetermined microscopic pattern can be formed on the work W along a longitudinal direction thereof (Z-axis direction in FIG. 1).

In this embodiment, the surface of the work W is processed stepwise to form a predetermined three-dimensional microscopic pattern thereon. For example, when forming groove-like figures over a plurality of rows in a circumferential direction of the work W, processing for forming grooves is conducted a plurality of times for each row. Specifically, continuous grooves are formed in the circumferential direction by first forming, in each row, patterns P each having a predetermined length at a predetermined pitch in the circumferential direction (see FIG. 4C), and forming a similar pattern between the patterns P arranged on the same row thereafter.

It should be noted that in addition to the example above, it is also possible to form a predetermined three-dimensional microscopic pattern on the surface of the work W using a plurality of tools so that a plurality of rows of the pattern are formed at the same time, for example.

(Detection of Cutting Force)

A cutting force applied to the tool 2 is detected in the process of processing the work W. Hereinafter, a cutting force detection method will be described.

Referring to FIG. 1, the output of the force sensor 6 measured during the processing of the work W is input to the computer 19 via the charge amplifier 21, the lock-in amplifier 17, and the A/D conversion board 22. The computer 19 stores and processes this detection signal of the force sensor 6 as a signal Sp measured during the processing of the work W (hereinafter, also referred to as "measurement signal").

The cutting force is a force that is generated when the shape of the cutting edge 12 of the tool 2 is transferred onto the work W. Therefore, the cutting force can be obtained by subtracting the output of the force measured during idling from the output measured during the processing. Specifically, by subtracting a component of the idle signal Sw from the measurement signal Sp, a signal Sc corresponding to the cutting force of the tool 2 with respect to the work W (hereinafter, also referred to as "cutting force signal") can be obtained. The cutting force is calculated by the computer 19.

Figure 6:
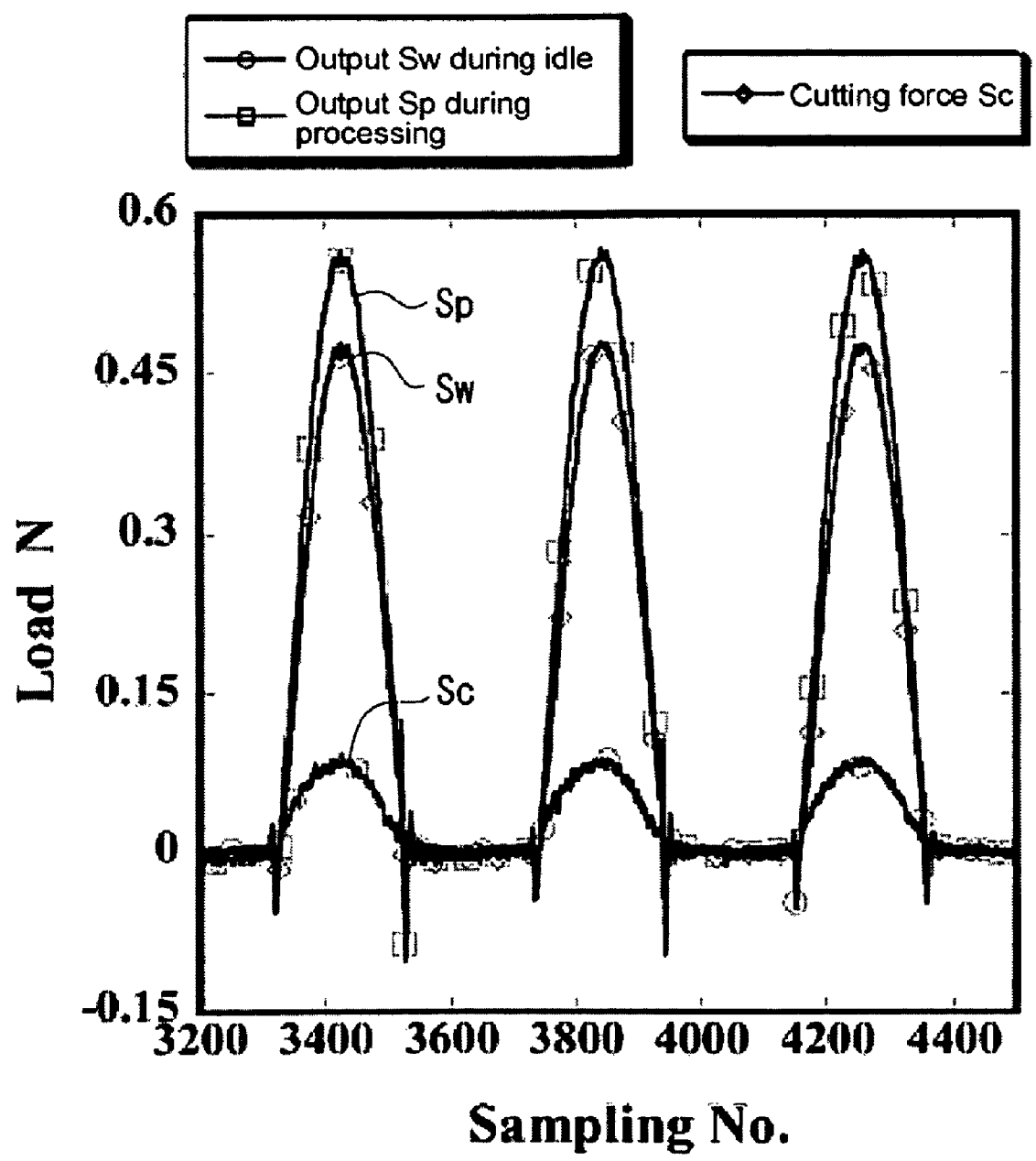
FIG. 6 is a diagram for illustrating a method of calculating a cutting force based on an output of the force sensor at a time of idle (idle signal) and an output thereof during processing (measurement signal)

FIG. 6 is a diagram showing an exemplary output of the force sensor 6 and illustrates relationships among the measurement signal Sp, the idle signal Sw, and the cutting force signal Sc. As the difference between the measurement signal Sp and the idle signal Sw increases, the precision in detecting the cutting force signal Sc becomes higher. Therefore, the smaller the output of the idle signal Sw, the higher the precision in detecting the cutting force.

According to this embodiment, because the force sensor 6 is disposed between the tool 2 and the head member 10 as described above, the force sensor 6 detects only the force component that is based on the inertial mass of the tool 2. Accordingly, the output of the force sensor 6 detected when no processing is carried out (idle signal Sw) can be made small. Thus, due to an increase in the difference between the output of the force sensor 6 detected when no processing is carried out and the output thereof detected during the processing (measurement signal Sp), it becomes possible to enhance the detection precision of the cutting force signal Sc.

(Effect of this Embodiment)

Hereinafter, descriptions will be given on the effect of this embodiment as compared with exemplary structures of the processing apparatuses respectively shown in FIGS. 7 and 8.

Figure 7:
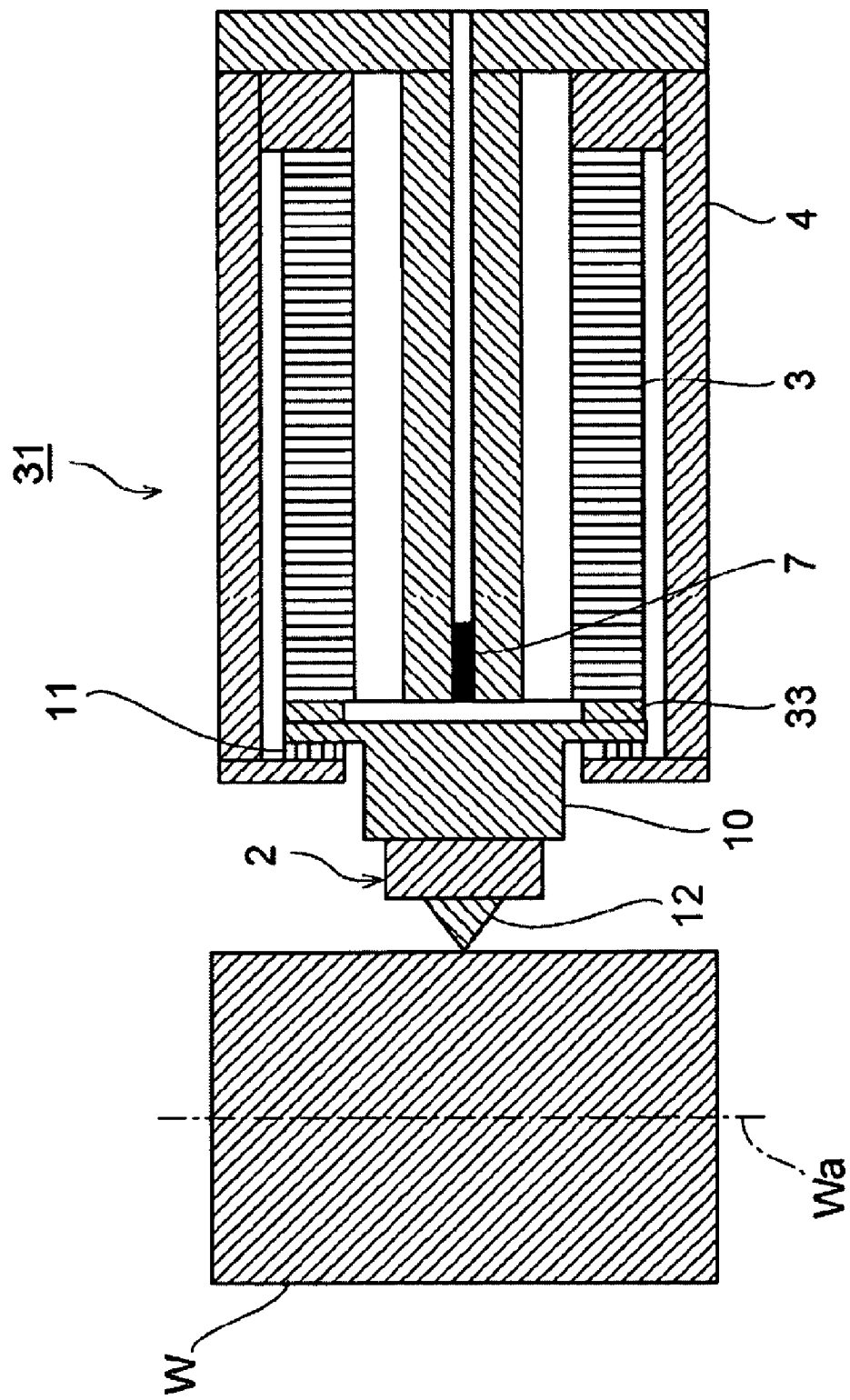
FIG. 7 is a schematic cross-sectional diagram showing a structure of a processing apparatus according to Comparative Example 1.
Figure 8:
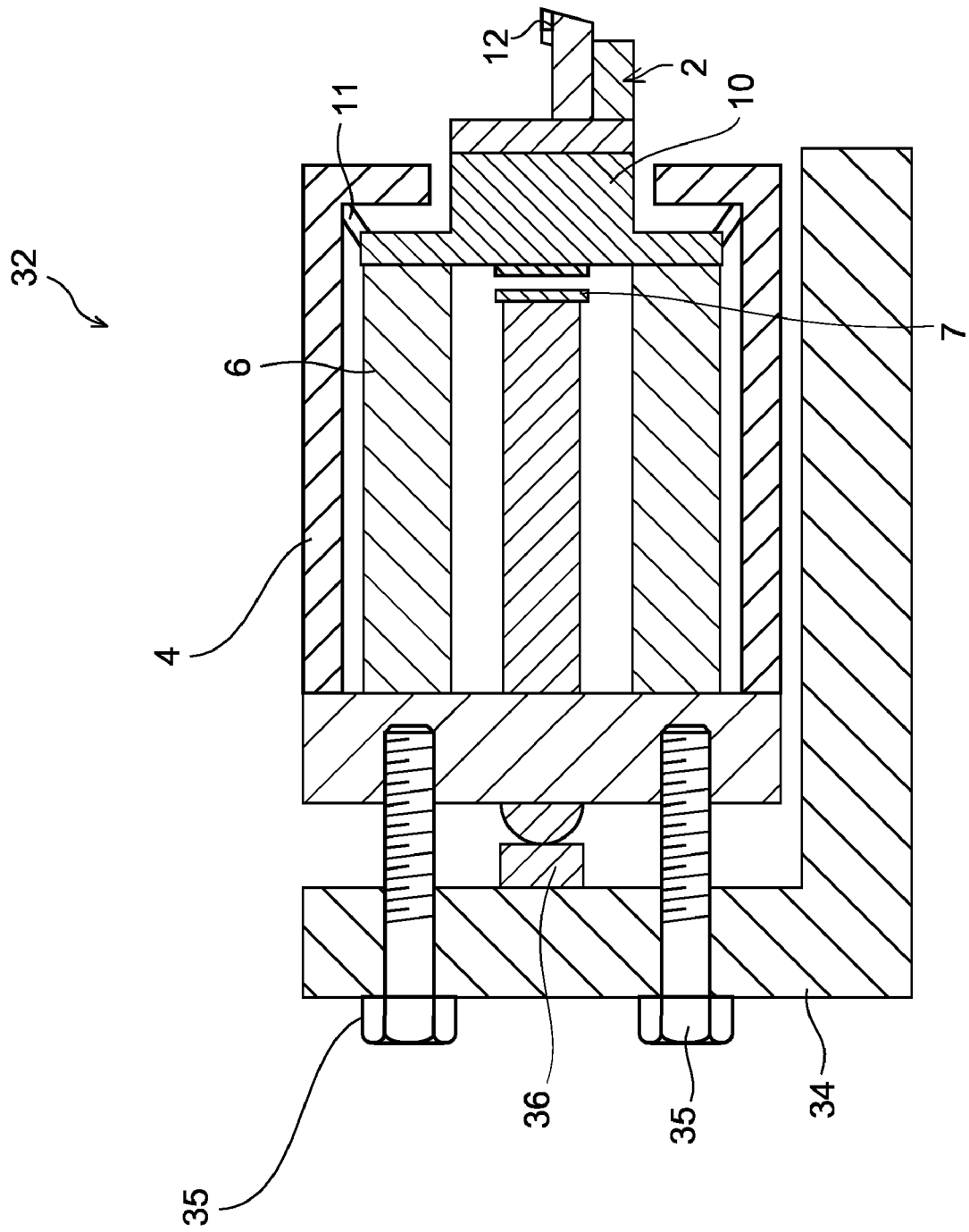
FIG. 8 is a schematic structural diagram showing a structure of a processing apparatus according to Comparative Example 2.

FIG. 7 is a schematic cross-sectional diagram showing a structure of a processing apparatus 31 according to Comparative Example 1. FIG. 8 is a schematic cross-sectional diagram showing a structure of a processing apparatus 32 according to Comparative Example 2. It should be noted that in FIGS. 7 and 8, parts corresponding to those of the processing apparatus 1 shown in FIG. 1 are denoted by the same reference symbols, and descriptions thereof will be omitted.

In the processing apparatus 31 shown in FIG. 7, a force sensor 33 is disposed between the head member 10 that supports the tool 2 and the actuator 3. In the processing apparatus 32 shown in FIG. 8, a casing body 4 that accommodates the actuator 3 is fixed to a base 34 by a plurality of screw members 35. A force sensor 36 is disposed between the casing body 4 and the base 34, and a preload of the force sensor 36 is set according to a tightening force of the screw members 35.

Figure 9:
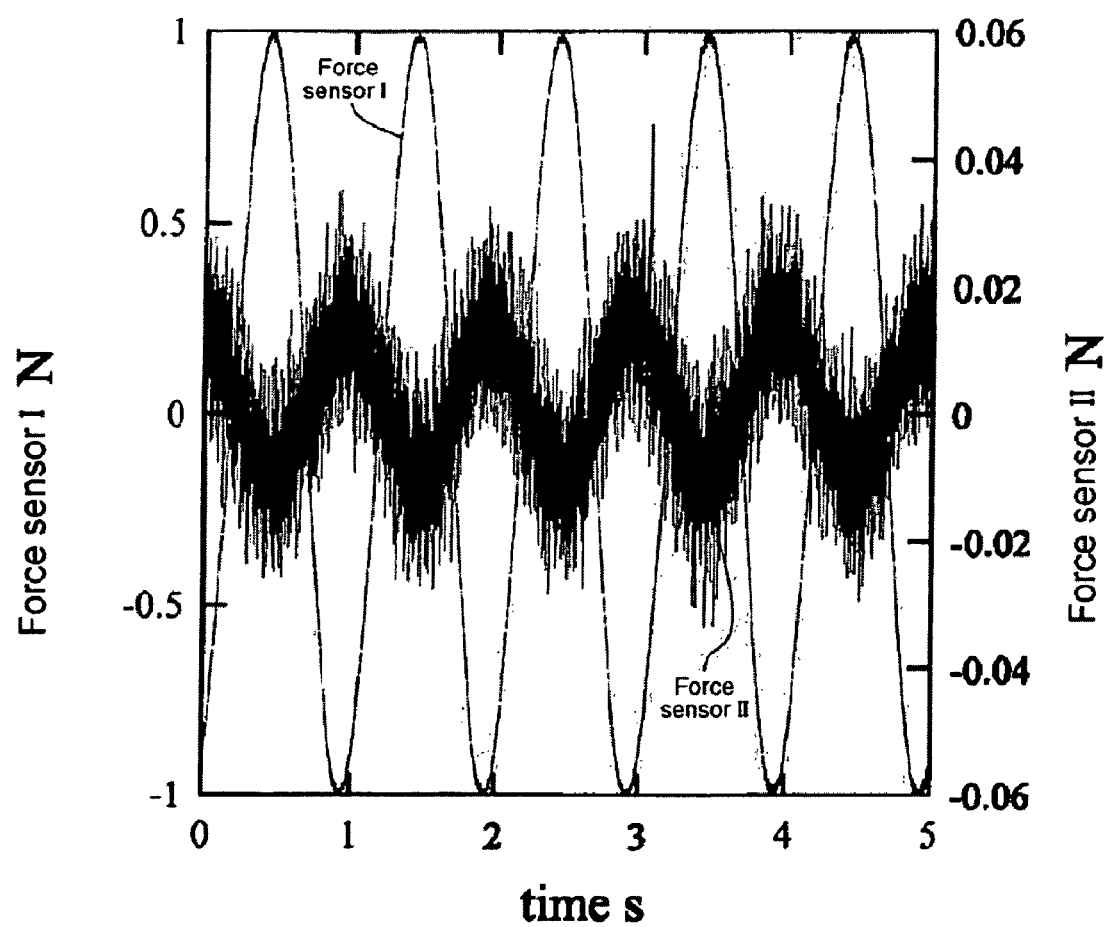
FIG. 9 is a diagram showing a relationship between an output of a force sensor in the processing apparatus shown in FIG. 7 and an output of a force sensor in the processing apparatus shown in FIG. 8.

FIG. 9 is a diagram showing an idle signal output by the force sensor 33 (sensor I) of the processing apparatus 31 according to Comparative Example 1 and an idle signal output by the force sensor 36 (sensor II) of the processing apparatus 32 according to Comparative Example 2.

In the processing apparatus 32 according to Comparative Example 2, because the force sensor 36 is disposed between the base 34 and the casing body 4, a force that acts not only on the tool 2 but also an inertial system including the actuator 3 that supports the tool 2 and the casing body 4 that accommodates the actuator 3 is inadvertently detected during the microscopic vibration of the tool 2. In other words, a force that is based on a mass component of the actuator 3 and the casing body 4 is detected simultaneously with the cutting force of the tool 2. As a result, as shown in FIG. 9, the output of the force sensor 36 (sensor II) exhibits a waveform on which noises are imposed, leading to a state where the force detection is difficult to be carried out at a high precision.

On the other hand, in the processing apparatus 31 according to Comparative Example 1, because the force sensor 33 is disposed between the elastic member 11 and the actuator 3, detection of a force not containing a force that is based on the mass component of the casing body 4 and the actuator 3 becomes possible during the microscopic vibration of the tool 2. As a result, as shown in FIG. 9, the output of the force sensor 33 (sensor I) can be detected with a higher sensitivity than the output of the force sensor 36 (sensor II).

In the processing apparatus 31 according to Comparative Example 1, however, because the force sensor 33 is disposed between the elastic member 11 and the actuator 3, a reaction force of the elastic member 11 is inadvertently detected simultaneously with the cutting force of the tool 2, resulting in an inconvenience that the output of the idle signal Sw increases. The output of the measurement signal Sp increases as hardness of the work increases, but a large output cannot be obtained when the work is made of a relatively-soft material such as copper or aluminum.

Figure 10:
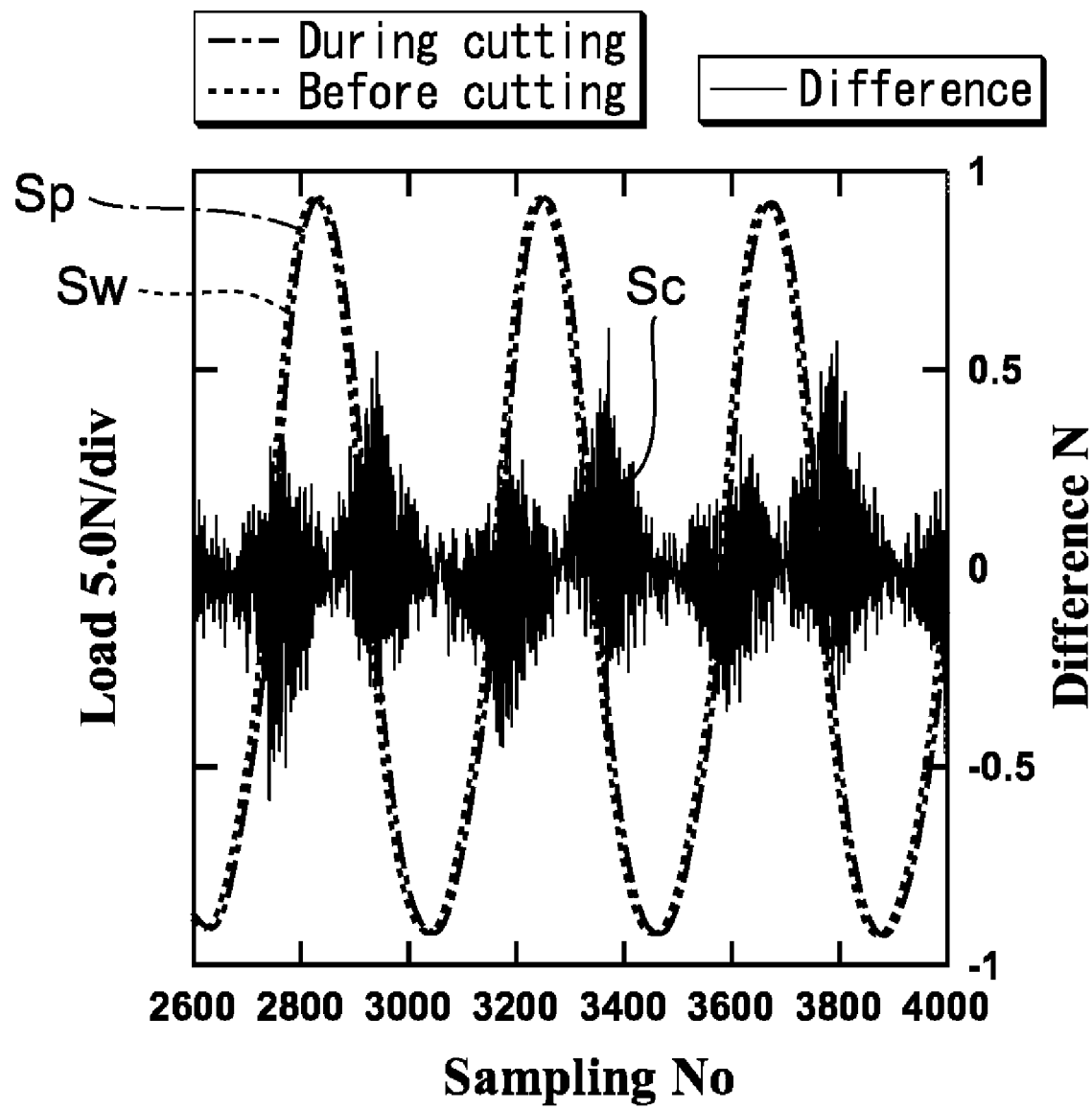
FIG. 10 is a diagram showing an exemplary output of the force sensor that may be caused in the processing apparatus shown in FIG. 7.

Therefore, if the output of the idle signal Sw is large when processing the soft work, a difference between the idle signal Sw and the measurement signal Sp may not be obtained, thus leading to a fear that a desired cutting force signal Sc cannot be obtained. FIG. 10 is a diagram showing an example of such a case. When the outputs of the idle signal Sw (broken line) and measurement signal Sp (dashed-dotted line) are nearly the same, the cutting force signal Sc (solid line) cannot be detected with high precision.

In this regard, in the processing apparatus 1 according to this embodiment, because the force sensor 6 is disposed between the tool 2 and the head member 10, the reaction force of the elastic member 11 is noninfluential. Therefore, according to this embodiment, it becomes possible to make the output of the idle signal Sw smaller than those of Comparative Examples 1 and 2. Accordingly, since the difference between the measurement signal Sp during the processing and the idle signal Sw can be increased, the cutting force signal Sc that is extracted as the difference between those two signals can be detected with high precision.

Figure 11A:
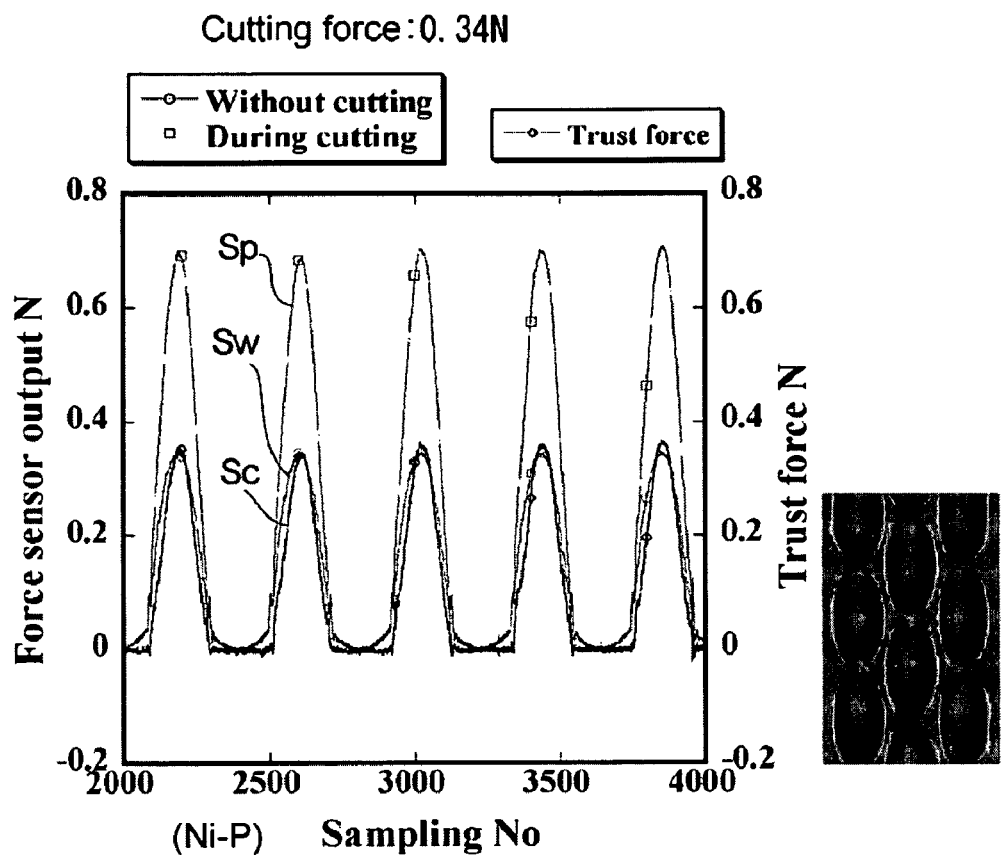
FIG. 11 are diagrams each showing an exemplary output of the force sensor in the processing apparatus according to an embodiment.
Figure 11B:
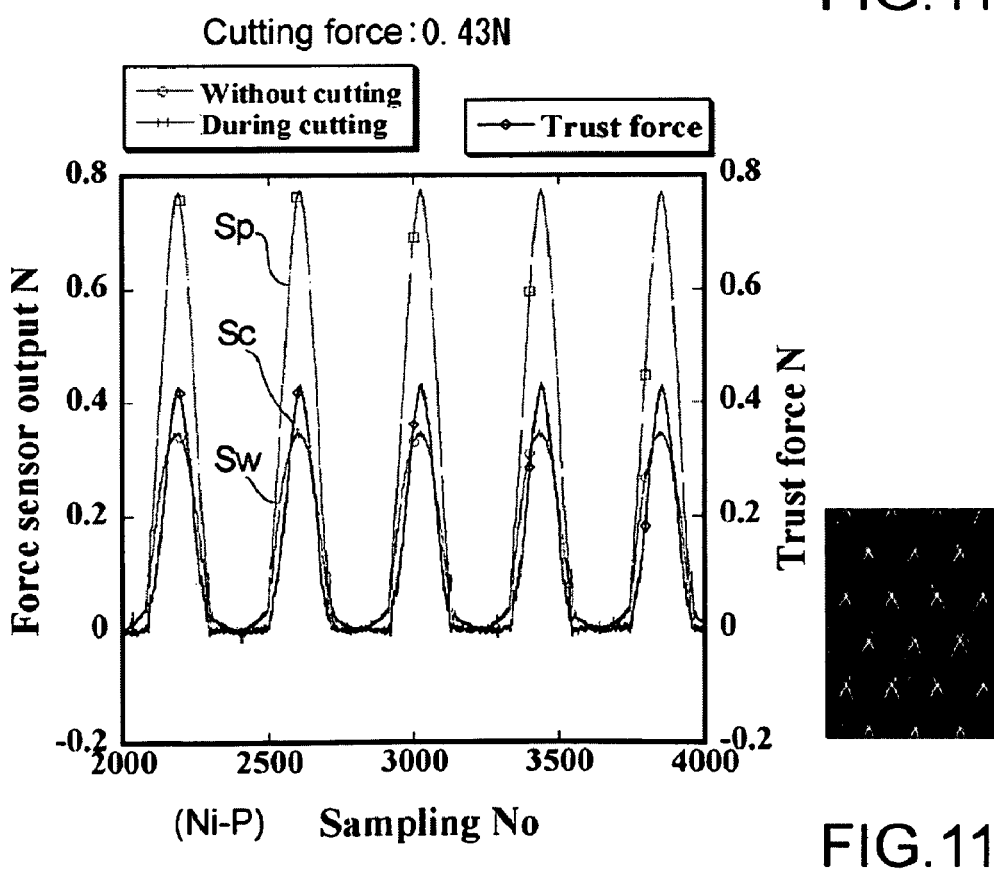

FIGS. 11A and 11B are diagrams each showing an exemplary output of the force sensor 6 (idle signal Sw, measurement signal Sp, and cutting force signal Sc) of the processing apparatus 1 with respect to the work W plated with Ni—P (nickel-phosphorus) on the surface thereof. Here, FIG. 11A shows a case where a smooth surface (prior to pattern processing) of the work is cut, and FIG. 11B shows a case where the surface of the work that has been processed to form a pattern thereon is additionally cut. The cutting force ("Trust force" in the figures) is 0.34 [N] in the example of FIG. 11A and 0.43 [N] in the example of FIG. 11B.

Figure 12A:
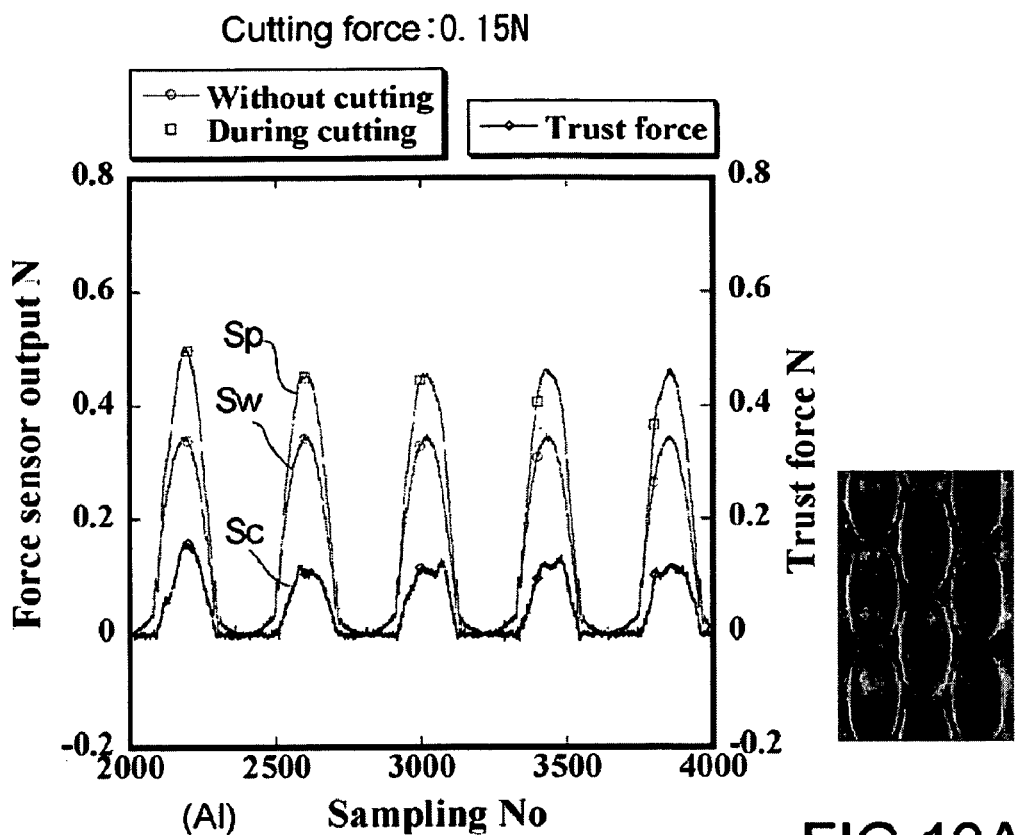
FIG. 12 are diagrams each showing a different exemplary output of the force sensor in the processing apparatus according to an embodiment.
Figure 12B:
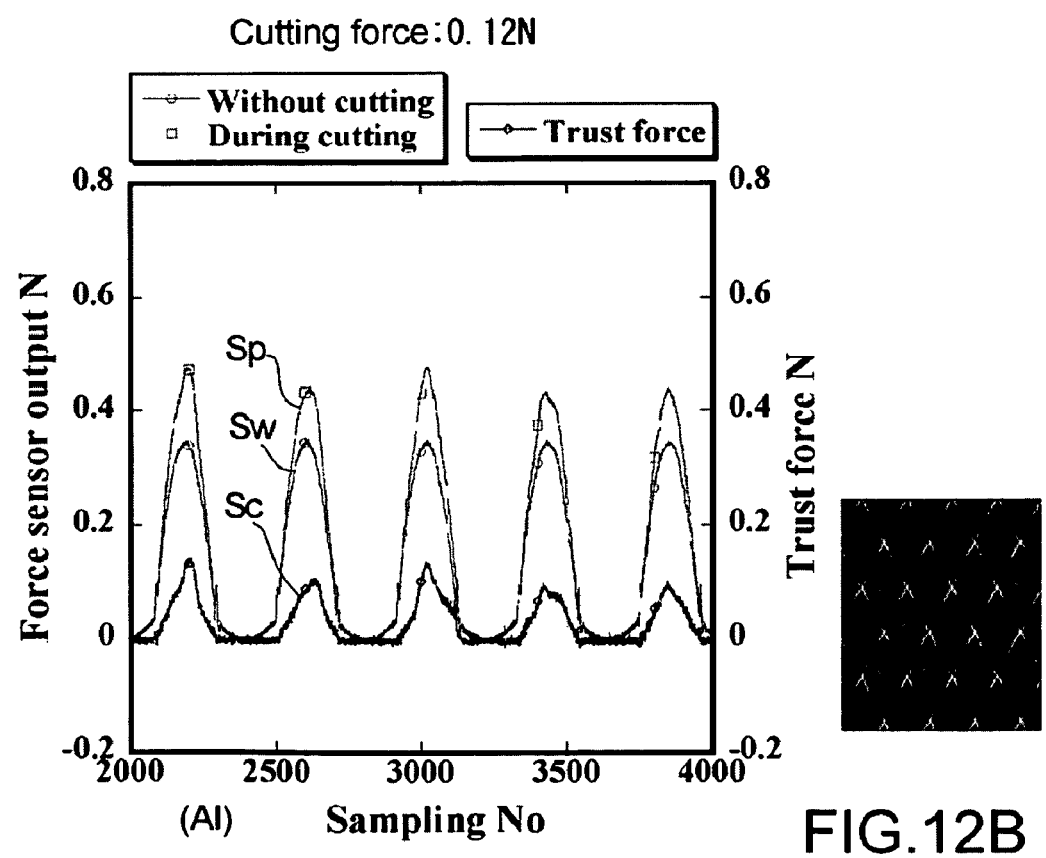

Further, FIGS. 12A and 12B are diagrams each showing an exemplary output of the force sensor 6 (idle signal Sw, measurement signal Sp, and cutting force signal Sc) of the processing apparatus 1 with respect to the work W made of Al (aluminum). Here, FIG. 12A shows a case where a smooth surface (prior to pattern processing) of the work is cut, and FIG. 12B shows a case where the surface of the work that has been processed to form a pattern thereon is additionally cut. The cutting force ("Trust force" in the figures) is 0.15 [N] in the example of FIG. 12A and 0.12 [N] in the example of FIG. 12B.

Figure 13A:
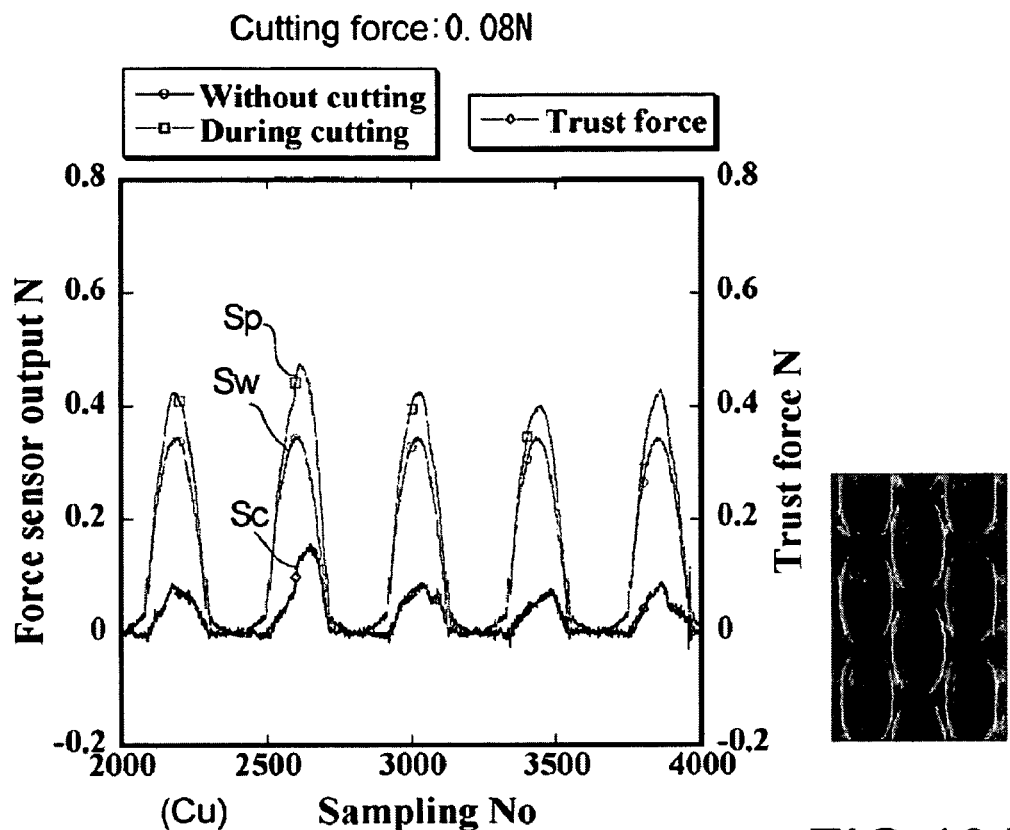
FIG. 13 are diagrams each showing a yet different exemplary output of the force sensor in the processing apparatus according to an embodiment.
Figure 13B:
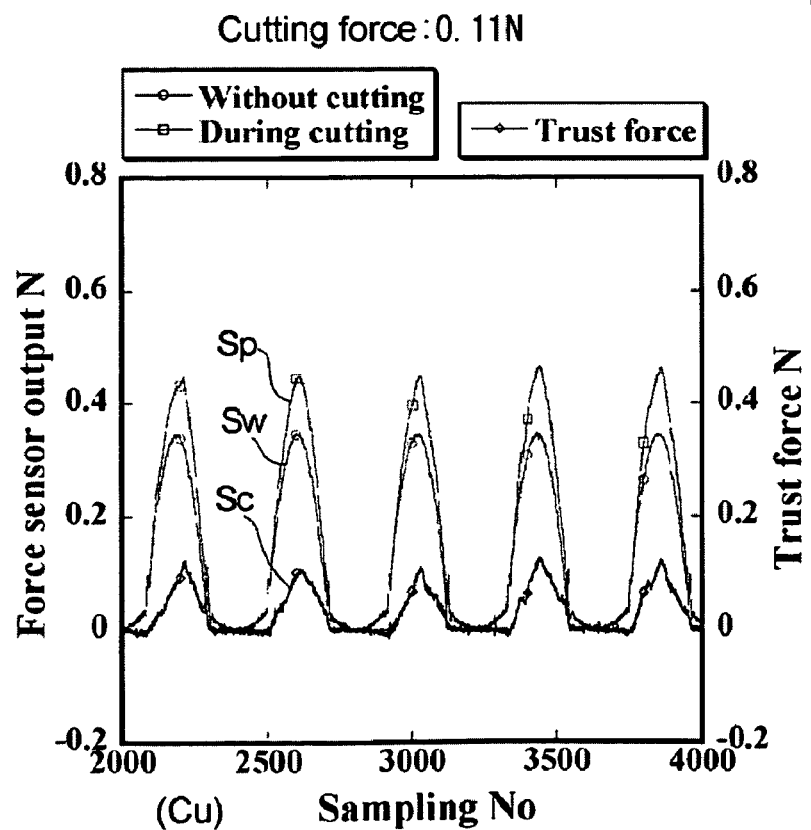

Furthermore, FIGS. 13A and 13B are diagrams each showing an exemplary output of the force sensor 6 (idle signal Sw, measurement signal Sp, and cutting force signal Sc) of the processing apparatus 1 with respect to the work W made of Cu (copper). Here, FIG. 13A shows a case where a smooth surface (prior to pattern processing) of the work is cut, and FIG. 13B shows a case where the surface of the work that has been processed to form a pattern thereon is additionally cut. The cutting force ("Trust force" in the figures) is 0.08 [N] in the example of FIG. 13A and 0.11 [N] in the example of FIG. 13B.

As shown in FIGS. 11 to 13, according to this embodiment, because the difference between the measurement signal Sp and the idle signal Sw is large, the cutting force signal Sc can be detected with high precision. Moreover, as shown in FIGS. 11A, 11B, 12A, 12B, 13A, and 13B, differences in the cutting forces according to states of the surface (smooth surface or concavoconvex surface) of the work can also be detected with high precision. Accordingly, the cutting force during the processing can be measured highly precisely, and the three-dimensional microscopic pattern can be formed on the surface of the work with high precision.

Furthermore, according to this embodiment, since the idle signal Sw can sufficiently be suppressed as compared to the measurement signal Sp, an output difference of a predetermined level or more can be secured between the measurement signal Sp and the idle signal Sw even with respect to the relatively-soft work such as aluminum or copper. Accordingly, as shown in FIGS. 12 and 13, the cutting force during the processing can be detected with high precision.

Second Embodiment

Next, a second embodiment will be described with reference to FIGS. 14 and 15. FIGS. 14A, 14B, 15A, and 15B are each a side view showing a schematic structure of a processing apparatus of this embodiment in the vicinity of a processing portion (tool) thereof. It should be noted that constituents other than the processing portion are the same as those of the first embodiment, and thus descriptions thereof will be omitted. In addition, in the figures, parts respectively corresponding to those of the first embodiment are denoted by the same reference symbols, and detailed descriptions thereof will be omitted.

This embodiment is different from the first embodiment in that the force sensor 6 is provided within a structure of the processing portion constituted of the cutting edge 12, the shank 13, and the tool holder 14.

Figure 14A:
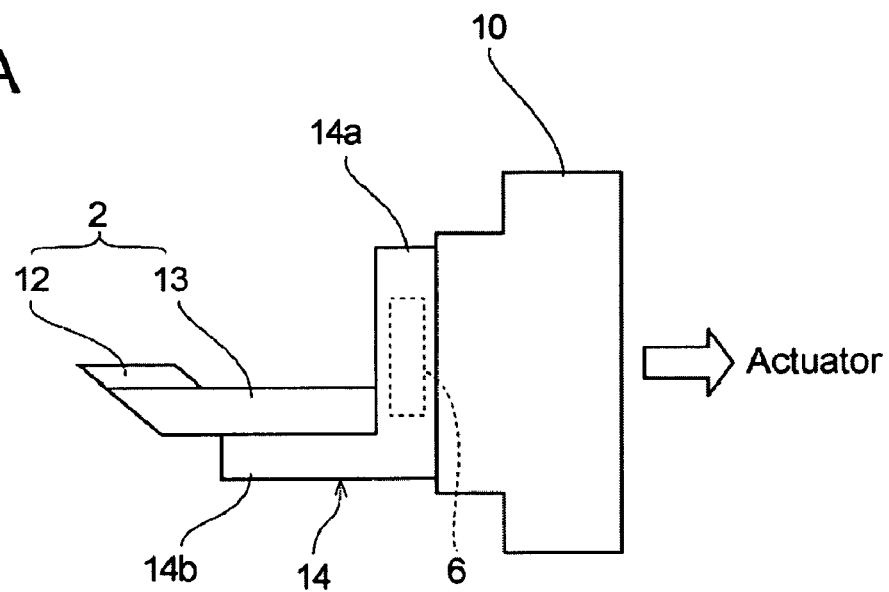
FIG. 14 are diagrams each showing an exemplary structure of a processing portion of a processing apparatus according to a second embodiment.

Specifically, in the processing apparatus having the structure shown in FIG. 14A, the force sensor 6 is embedded in the tool holder 14 that retains the tool 2. The tool holder 14 has an L shape and includes a first arm portion 14a positioned between the shank 13 and the head member 10 and a second arm portion 14b that is orthogonal to the first arm portion 14a and supports the shank 13. The force sensor 6 is embedded in the first arm portion 14a.

The structure above also bears the same operation and effect as the first embodiment. Further, because the tool holder 14 and the force sensor 6 can be integrated, the number of constituents provided in the vicinity of the processing portion of the processing apparatus can be reduced.

Figure 14B:
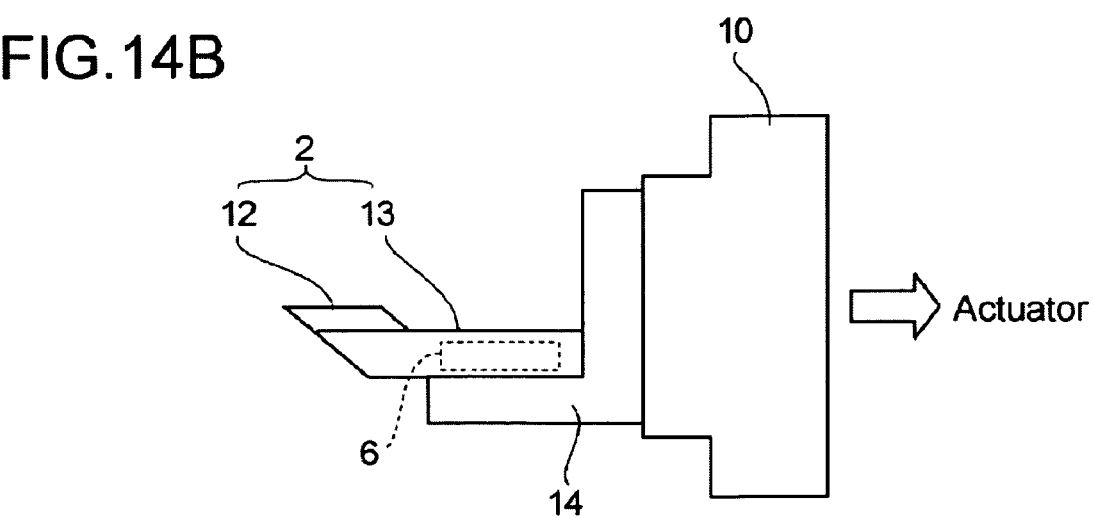

In the processing apparatus having the structure shown in FIG. 14B, the force sensor 6 is embedded in the shank 13 constituting the tool 2. With this structure, it becomes possible for the force sensor 6 to detect only the force that is based on the mass component of the cutting edge 12 and a part of the shank 13. Thus, the output of the idle signal Sw of the tool 2 can be additionally suppressed to thus realize an additional enhancement in precision in detecting the cutting force signal Sc as compared to the first embodiment.

Figure 15A:
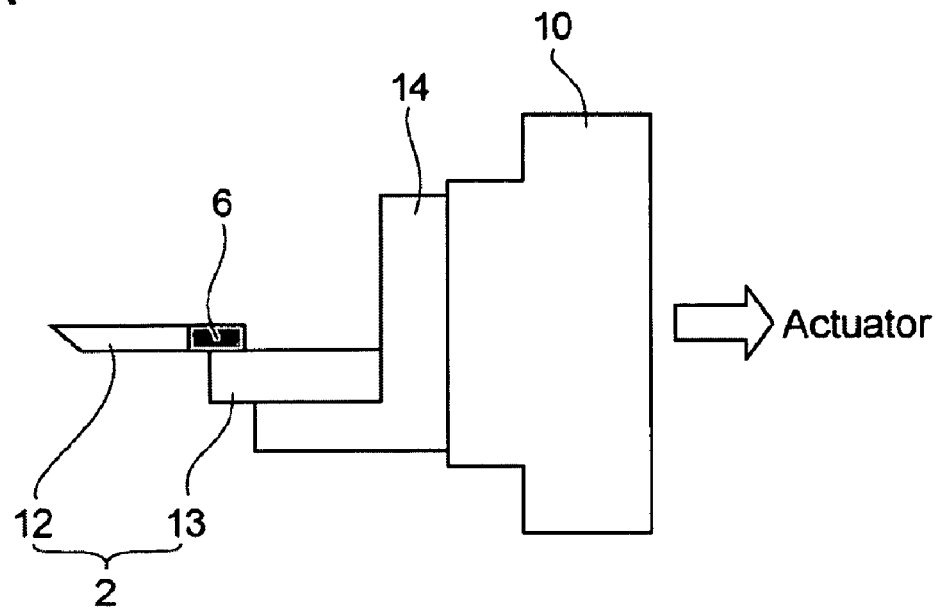
FIG. 15 are diagrams each showing a different exemplary structure of the processing portion of the processing apparatus according to a second embodiment.
Figure 15B:
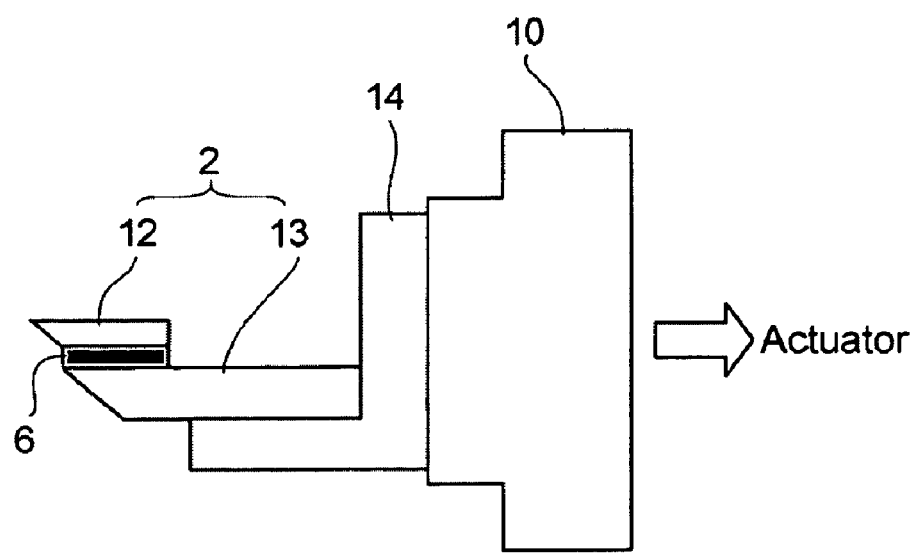

On the other hand, in the processing apparatuses having the structures respectively shown in FIGS. 15A and 15B, the force sensor 6 is provided between the cutting edge 12 and the shank 13 that constitute the tool 2. Particularly in the structure of FIG. 15A, an end portion of the force sensor 6 is connected to a base portion of the cutting edge 12, and a bottom surface of the force sensor 6 is partially jointed to an upper surface of the shank 13. In the structure of FIG. 15B, an upper surface of the force sensor 6 is jointed to a lower surface of the cutting edge 12, and a lower surface of the force sensor 6 is jointed to an upper surface of the shank 13. It should be noted that although not shown, the force sensor 6 may alternatively be disposed between the shank 13 and the tool holder 14.

With the structures shown in FIG. 15, the force signal detected by the force sensor 6 essentially contains only the inertial force that acts on the cutting edge 12. As a result, the output of the idle signal Sw of the tool 2 can be additionally suppressed to thus realize an additional enhancement in precision in detecting the cutting force as compared to the structures shown in FIG. 14.

Third Embodiment

Figure 16:
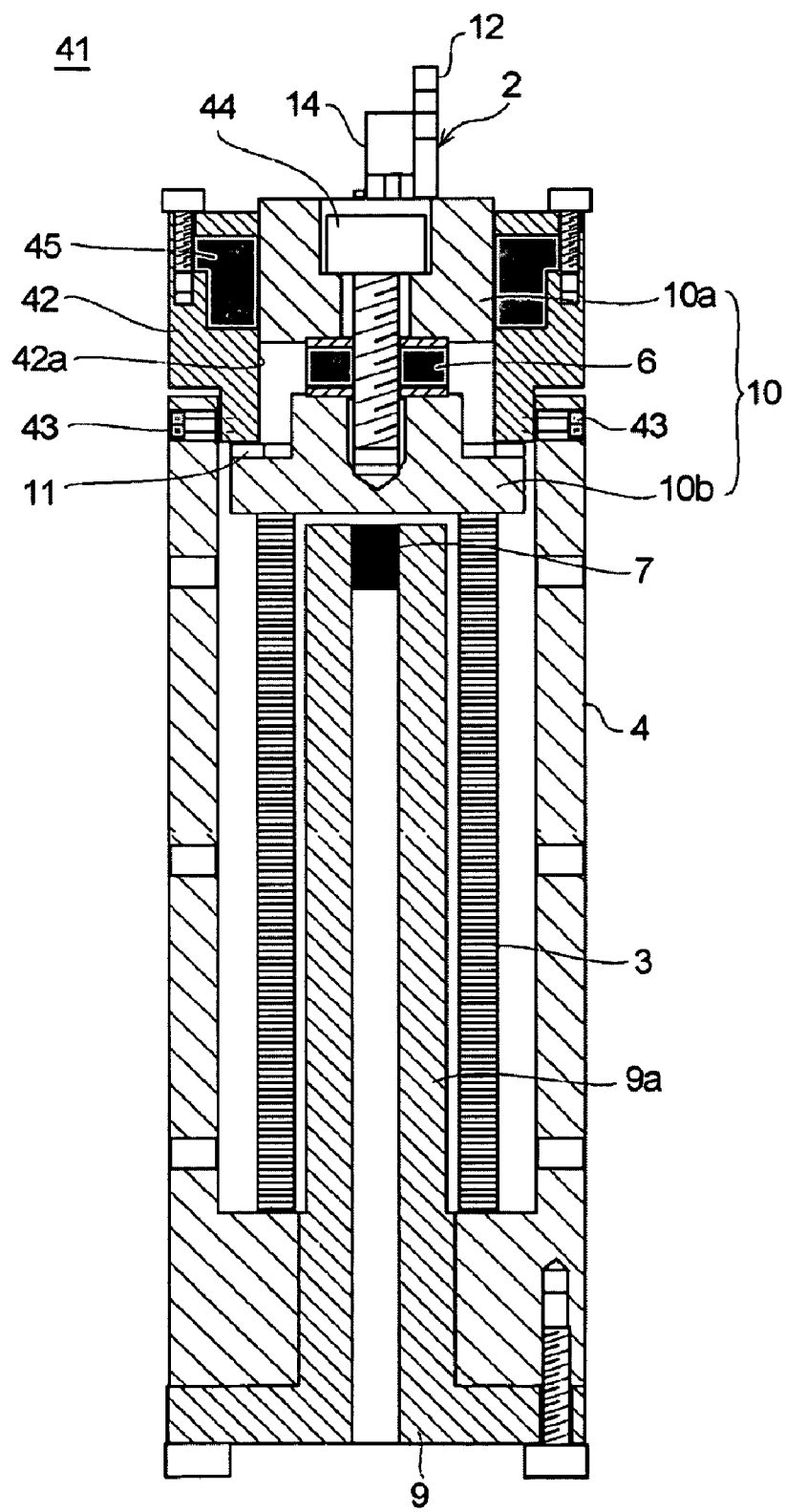
FIG. 16 is a cross-sectional diagram showing a structure of a processing apparatus according to a third embodiment.

FIG. 16 is a cross-sectional side view showing a structure of a processing apparatus 41 according to a third embodiment. It should be noted that in the figure, parts corresponding to those of the first embodiment are denoted by the same reference symbols, and detailed descriptions thereof will be omitted.

In the processing apparatus 41 of this embodiment, the head member 10 that supports the tool 2 has a dually-partitioned structure constituted of a first head member 10a and a second head member 10b. The first head member 10a supports the tool 2, and the second head member 10b is integrally fixed to an end portion of the actuator 3. In addition, the force sensor 6 is disposed between the first head member 10a and the second head member 10b.

The force sensor 6 is constituted of a piezoelectric device. At a center portion of the force sensor 6, a through-hole through which a shank of a screw member 44 that integrally fixes the first head member 10a and the second head member 10b passes is formed, and a preload of the force sensor 6 is set based on the tightening force of the screw member 44. The screw member 44 constitutes a pressing mechanism that presses the force sensor 6 against the head member 10. It should be noted that an axle center position of the screw member 44 coincides with that of the actuator 3.

A preload mechanism that presses the second head member 10b against the end portion of the actuator 3 is provided at a tip end portion of the casing body 4. The preload mechanism is attached to an opening end of the casing body 4 and includes a guide member 42 formed with, at a center portion thereof, a guide hole 42a into which the first head member 10a is inserted and the elastic member 11 disposed between the guide member 42 and the second head member 10b.

The elastic member 11 is constituted of a wave washer that has an inner diameter larger than an outside dimension of the force sensor 6. A predetermined preload is imparted to the actuator 3 by an elastic force of the elastic member 11. It should be noted that the guide member 42 is fixed to the casing body 4 by a plurality of screw members 43 screwed to a circumferential side portion of the guide member 42 via a plurality of screw holes formed on a circumferential side portion of the casing body 4. It should also be noted that an inner diameter of each of the screw holes is formed to be substantially the same as a diameter of a head portion of each of the screw members 43.

The guide member 42 supports the head member 10 inserted to the guide hole 42a such that the head member 10 can slide a predetermined distance in an axial direction of the screw member 44 by extension/retraction driving of the actuator 3. A slide amount of the head member 10 is within a range of an elastic deformation amount of the elastic member 11. In this embodiment, a part of the guide hole 42a, that is, a movement guide portion of the first head member 10a is constituted of a bush 45 mounted to the guide member 42. The bush 45 can be formed of a low-friction alloy material or rubber material. It should be noted that instead of providing the bush 45, a slide surface of the first head member 10a may be formed of the same material as the guide member 42.

The processing apparatus 41 of this embodiment structured as described above also bears the same operation and effect as the processing apparatus of the first embodiment. According to this embodiment in particular, because an arbitrary preload can be set to the force sensor 6 by the tightening force of the screw member 44, a stable force detection signal of the force sensor 6 can be obtained.

Moreover, according to this embodiment, since an axial movement of the head member 10 can be regulated by the guide member 42, it becomes possible to enhance detection precision of the force sensor 6 and measure the cutting force with high reliability. Further, since the force sensor 6 has a smaller outside dimension than the elastic member 11, the force sensor 6 is hardly affected by the moment regarding the center portion of the actuator 3, as compared to the force sensor 33 that is formed to have substantially the same size as the elastic member 11 in the processing apparatus 31 described with reference to FIG. 7. Accordingly, the precision in detecting the cutting force by the force sensor 6 can be enhanced.

(Specific Example of Work)

In addition to fields of FPDs, solar cells, and the like, the processing apparatus according to the embodiments can be used in various fields. A forming roll used for producing an optical sheet (or optical film) mounted to a liquid crystal display (LCD) can be formed using the processing apparatus of this embodiment.

Figure 17:
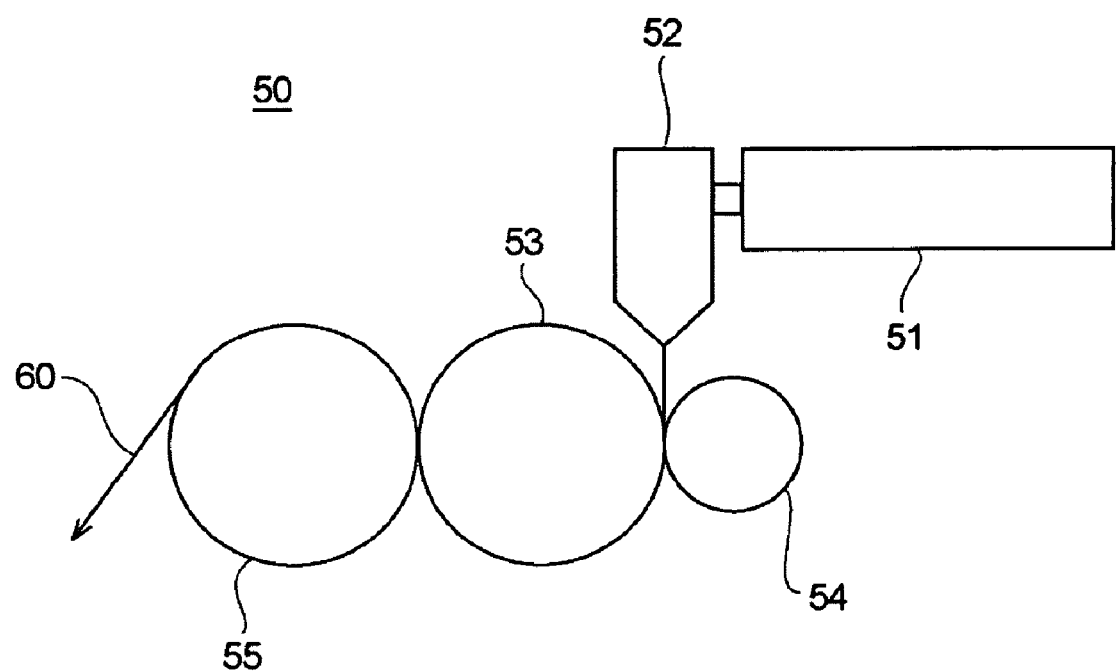
FIG. 17 is a schematic structural diagram of an optical sheet forming equipment that includes a forming roll processed using the processing apparatus according to an embodiment.

FIG. 17 is a schematic structural diagram showing an optical sheet forming equipment 50. The forming equipment 50 includes an extruder 51, a T-shaped die 52, a forming roll 53, an elastic roll 54, and a cooling roll 55. The extruder 51 melts down a resin material supplied from a hopper (not shown) and supplies the material to the T-shaped die 52. The T-shaped die 52 expands the resin material supplied from the extruder 51 until it reaches a desired width of a sheet to be formed and discharges the material. The molten resin discharged from the T-shaped die 52 is nipped by the forming roll 53 and the elastic roll 54 and formed into a sheet by the forming roll 53. The formed resin sheet is then cooled by the cooling roll 55 and continuously formed as an optical sheet 60.

Figure 18A:
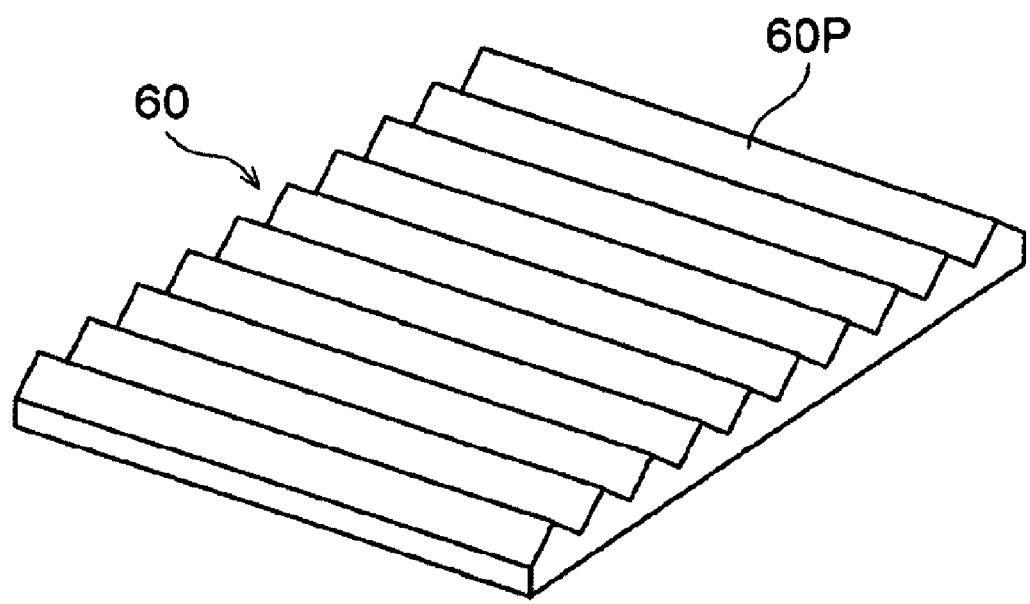
FIG. 18 are perspective diagrams each showing an exemplary structure of an optical sheet produced using the forming equipment shown in FIG. 17.
Figure 18B:
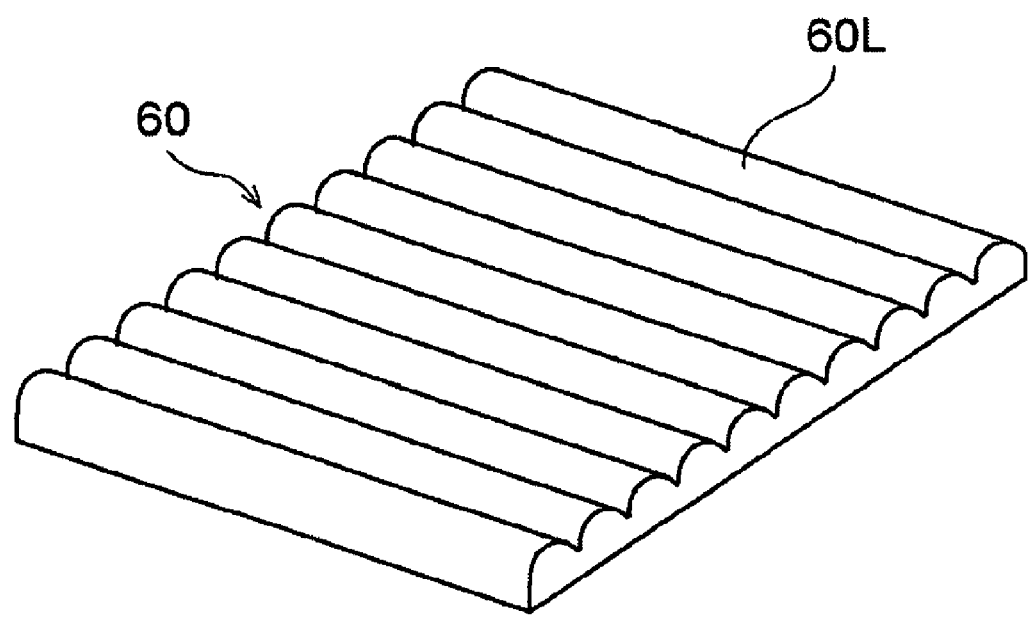

The forming roll 53 is a cylindrical body plated with Ni—P and Cu on a surface of a stainless main body constituting the forming roll 53 and can be rotationally driven with a center axis thereof as a rotation axis. A cylinder surface of the forming roll 53 is formed with a three-dimensional microscopic pattern (not shown) used for transferring a concavoconvex pattern on a main surface of the optical sheet 60. The microscopic pattern is a microscopic concavoconvex pattern used for transferring, for example, prism bodies 60P shown in FIG. 18A, cylindrical lens bodies 60L shown in FIG. 18B, and micro lens bodies (not shown) onto the sheet. Moreover, the microscopic pattern faces a circumferential direction or axial direction of the cylindrical forming roll 53.

On the optical sheet, prism bodies or cylindrical lens bodies are formed continuously at a pitch of, for example, several μm to several hundred μm. For efficiently condensing light from a backlight of the liquid crystal display, the prism bodies and the like need to be formed to be exactly the same as a desired optical design, thus making it essential that the microscopic pattern on the surface of the forming roll have a desired alignment.

The processing apparatus 1 according to the embodiment as shown in FIG. 1, for example, can be used for forming the concavoconvex pattern on the surface of the forming roll 53. A diamond cutting tool, for example, is used as the cutting edge 12 of the tool 2. According to an embodiment, in processing the forming roll 53, the forming roll 53 can be processed microscopically while the cutting force of the tool 2 is measured accurately. Thus, the alignment of the microscopic pattern can be prevented from being distorted, and a depth of grooves of concave figures or a height of apexes of convex figures can be prevented from being varied.

The present application is not limited to the above described embodiments, and various modifications can be made.

For example, although the force sensor 6 has been constituted of a piezoelectric device in the above embodiments, the present application is not limited thereto, and other detectors such as a distortion gauge may be used instead. Similarly, although the actuator 3 has been constituted of a piezoelectric device laminated body, an electromagnetic actuator including a solenoid and a core may be used instead.

Moreover, the above embodiments have taken an example where the processing apparatus according to an embodiment is used for processing the surface of the work to form a microscopic pattern thereon. However, the processing apparatus according to the above embodiments can be used for other purposes as described below.

(Detection of Abrasion or Breakage of Tool)

By using the output of the force sensor 6 measured with high precision, the processing apparatus 1 according to an embodiment can detect an abrasion or a breakage such as chipping of the cutting edge 12 during the processing. Accordingly, it becomes easier to determine when to replace the tool 2, and productivity can therefore be enhanced.

(Measurement of Tool Abrasion Amount)

The processing apparatus 1 according to an embodiment can also measure an abrasion amount of the cutting edge 12. Specifically, the abrasion amount of the tool 2 can be measured by detecting, during the process of detecting the in-contact state of the work and the tool that is carried out prior to the processing, a change in the contact position based on the output of the displacement sensor 7. Moreover, the same method can be used to obtain a deviation amount of a tip end position of the tool 2 that is caused due to an attachment error caused when replacing the tool 2, a difference in the dimensions of the tools 2, or the like.

(Measurement of Pattern formed by Processing Surface)

By controlling the driving of the actuator 3 by the controller 15 such that the measurement value of the force sensor 6 becomes constant, the processing apparatus 1 according to the embodiment can measure the pattern formed on the surface of the work W based on the displacement detected by the displacement sensor 7. Furthermore, the same method can be used to measure the shape of the tool 2 at the tip end thereof while using a reference sample whose shape is already known.

(Measurement of Tool Cutting Characteristics)

By directly inputting the output of the force sensor 6 measured with high precision to the A/D conversion board 22, cutting characteristics of the tool 2 can be checked. Accordingly, it becomes possible to optimize processing conditions and enhance accuracy of the pattern formed by processing the surface.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A processing apparatus, comprising:
 a processing portion including a cutting edge;
 an actuator configured to cause the processing portion to vibrate microscopically;

a casing configured to accommodate the actuator;

a preload mechanism disposed inside the casing and configured to impart a preload to the actuator, the preload mechanism including a head member that is in contact with the actuator and is driven relative to the casing together with the processing portion, and an elastic member disposed between the casing and the head member and configured to press the head member against the actuator;

a force sensor disposed between the cutting edge and the head member;

a displacement sensor configured to detect a displacement of the processing portion with respect to the casing; and a detection means for detecting a cutting force of the processing portion based on an output of the force sensor.

2. The processing apparatus according to claim 1,
wherein the processing portion includes a retention portion configured to retain the cutting edge, and
wherein the force sensor is disposed between the retention portion and the head member.

3. The processing apparatus according to claim 1,
wherein the processing portion includes a retention portion configured to retain the cutting edge, and
wherein the force sensor is disposed between the cutting edge and the retention portion.

4. The processing apparatus according to claim 1,
wherein the processing portion includes a retention portion configured to retain the cutting edge, and
wherein the force sensor is embedded in the retention portion.

5. The processing apparatus according to claim 1,
wherein the elastic member is a wave washer, and
wherein the force sensor is constituted of a piezoelectric device that has a smaller outside dimension than the wave washer.

6. The processing apparatus according to claim 1, further comprising
a mechanism configured to press the force sensor against the head member, the mechanism being disposed between the processing portion and the force sensor.

7. The processing apparatus according to claim 1,
wherein the detection means includes a drive circuit configured to drive the actuator.

8. A processing apparatus, comprising:
a processing portion including a cutting edge;
an actuator configured to cause the processing portion to vibrate microscopically;
a casing configured to accommodate the actuator;
a preload mechanism disposed inside the casing and configured to impart a preload to the actuator, the preload mechanism including a head member that is in contact with the actuator and is driven relative to the casing together with the processing portion, and an elastic member disposed between the casing and the head member and configured to press the head member against the actuator;
a force sensor disposed between the cutting edge and the head member;
a displacement sensor configured to detect a displacement of the processing portion; and a control means for driving the actuator based on an output of the force sensor and an output of the displacement sensor.

* * * * *